US009789505B2

(12) United States Patent
Kimpel, Jr. et al.

(10) Patent No.: US 9,789,505 B2
(45) Date of Patent: Oct. 17, 2017

(54) COATING APPARATUS AND METHOD OF COATING JOINT

(71) Applicant: Commercial Coating Services International, LLC, Conroe, TX (US)

(72) Inventors: Rick Kimpel, Jr., Conroe, TX (US); Gunnar Power, Conroe, TX (US); Wilfredo Caraballo, Conroe, TX (US); Bryan Karasek, Conroe, TX (US)

(73) Assignee: Aegion Coating Services, LLC, Conroe, TX (US)

( * ) Notice: Subject to any disclaimer, the term of this patent is extended or adjusted under 35 U.S.C. 154(b) by 0 days.

(21) Appl. No.: 14/871,798

(22) Filed: Sep. 30, 2015

(65) Prior Publication Data

US 2017/0087577 A1    Mar. 30, 2017

(51) Int. Cl.
*B05B 13/02*    (2006.01)
*B05C 5/02*    (2006.01)

(52) U.S. Cl.
CPC ............ *B05B 13/0207* (2013.01); *B05C 5/02* (2013.01)

(58) Field of Classification Search
None
See application file for complete search history.

(56) References Cited

U.S. PATENT DOCUMENTS 3,776,179 A    12/1973    Raney et al.
3,921,440 A    11/1975    Toth

| 4,331,034 A | 5/1982 | Takeda et al. |
| 4,434,660 A | 3/1984 | Michaels et al. |
| 4,722,142 A | 2/1988 | Schmidt |
| 4,938,081 A | 7/1990 | Negishi |
| 4,974,168 A | 11/1990 | Marx |
| 5,069,234 A | 12/1991 | Nielsen |

(Continued)

FOREIGN PATENT DOCUMENTS

DE    3702078 A1    8/1988
NO    WO2014168825 A2    10/2014

(Continued)

OTHER PUBLICATIONS

International Search Report of related application No. PCT/IB2016/055890, 6 pgs, mailed Feb. 16, 2017.

(Continued)

*Primary Examiner* — Dah-Wei D Yuan
*Assistant Examiner* — Jethro M Pence
(74) *Attorney, Agent, or Firm* — Senniger Powers LLP

(57) ABSTRACT

A coating apparatus for coating a perimeter surface of a pipeline. A frame selectively mounts a sprayer on the pipeline. The sprayer can spray fluid along a flow path in a spraying mode and preparation mode. In the preparation mode, a fluid diverter moves into the flow path to divert the fluid delivered from the sprayer away from the pipeline. In the spraying mode, the fluid diverter moves out of the flow path to permit the sprayer to coat the perimeter surface of the pipeline with a curable liquid. A vacuum system can draw a vacuum through the diverter to remove the fluid the sprayer sprays in the preparation mode. The flow path can be located in a spray shroud. The diverter can fluidly couple the vacuum system to the shroud interior in the spraying mode to remove overspray.

16 Claims, 21 Drawing Sheets

(56) References Cited

U.S. PATENT DOCUMENTS

| | | | |
|---|---|---|---|
| 5,207,833 A * | 5/1993 | Hart | B05B 13/0436 |
| | | | 118/307 |
| 6,243,661 B1 | 6/2001 | Baldwin et al. | |
| 6,254,709 B1 | 7/2001 | Kamiyama et al. | |
| 6,621,516 B1 | 9/2003 | Wasson et al. | |
| 6,803,854 B1 | 10/2004 | Adams et al. | |
| 6,881,266 B1 | 4/2005 | Daykin et al. | |
| 7,077,020 B2 | 7/2006 | Langley et al. | |
| 7,460,980 B2 | 12/2008 | Hinn | |
| 7,656,997 B1 | 2/2010 | Anjelly | |
| 7,786,415 B2 | 8/2010 | Thomas et al. | |
| 7,952,485 B2 | 5/2011 | Schechter et al. | |
| 7,970,734 B2 | 6/2011 | Townsend et al. | |
| 8,128,853 B2 | 3/2012 | St. Onge et al. | |
| 9,194,529 B2 | 11/2015 | Pajak et al. | |
| 2004/0221981 A1 * | 11/2004 | Beale | B22D 5/02 |
| | | | 164/323 |
| 2008/0048682 A1 | 2/2008 | Brusco et al. | |
| 2008/0300748 A1 | 12/2008 | Drummy et al. | |
| 2009/0139337 A1 | 6/2009 | Owens et al. | |
| 2010/0275694 A1 | 11/2010 | Roberts | |
| 2013/0014598 A1 | 1/2013 | Langley et al. | |

FOREIGN PATENT DOCUMENTS

| | | |
|---|---|---|
| WO | 9527170 | 10/1995 |
| WO | 2012129703 | 10/2012 |

OTHER PUBLICATIONS

Written Opinion of related application No. PCT/IB2016/055890, 10 pgs, mailed Feb. 16, 2017.

* cited by examiner

COATING APPARATUS AND METHOD OF COATING JOINT

FIELD

The present disclosure generally relates to an apparatus for coating pipelines and more particularly to an apparatus for spraying joined end portions of adjacent pipe sections with a liquid coating material.

BACKGROUND

Conventional pipelines are formed by arranging separate lengths or sections of pipe end to end and then joining them together. Typically, central portions of each pipe section are coated with an anticorrosion coating during manufacturing and end portions of the pipe section are left uncoated to allow for joining. Pipe sections in a pipeline are often joined together using girth wells. Adjacent end portions of joined pipe sections should be coated with an anticorrosion coating after they are joined. Conventional liquid coating systems spray a coating around the exposed end portions of joined pipe sections in the field.

Coating systems can include a coating apparatus configured to be selectively mounted on a pipeline near an exposed joint surface. Typically, such a coating apparatus includes a frame that mounts a sprayer for spraying a curable liquid toward the joint surface. Frames can include movable frame members that open to install and remove the apparatus from the pipeline and close around the pipe. Operators must be careful when installing and removing the frame from the pipeline. Particularly when removing the frame from the pipeline after coating, it is important to avoid contacting the pipeline and damaging the coating. Certain coating apparatuses are configured to rotate around the pipeline to coat the entire circumference of the pipeline at a joint. In general, it is desirable for the frame to close securely around the pipe before spraying to ensure the coating apparatus stays mounted on the pipe as it rotates.

Typically, before or after spraying liquid coating material through a sprayer, flushing fluid is dispensed through the spray nozzle to purge contaminants and buildup. The flushing fluid can adversely affect the quality of the coating if it is allowed to contact the exposed end portions of the joined pipe sections or the recently sprayed on coating. Thus, conventional liquid coating systems orient the spray nozzle away from the pipe sections during flushing. After the sprayer has been flushed, the nozzle is repositioned to spray liquid coating material onto the exposed end portions of the joined pipe sections. Typical liquid coating materials produce overspray that should be removed from the target area during spraying.

Coating systems can include process rigs that deliver fluids that form the curable liquid to the coating apparatus. In conventional process rigs, day tanks store one or more components of the curable liquid. The components of the curable liquid are manually poured into the day tanks prior to spraying. As the day tanks are emptied, the operators must refill the day tanks to continue coating.

A fluid system connects a process rig to the coating apparatus. Typically, the fluid system will include various indicators of process conditions, such as temperature, pressure, level, and flow indicators. An operator monitors the indicators and adjusts various components of the system to control the process.

In general it is desirable for the operator to control the process to achieve desired process conditions during coating. It is thought that certain process temperatures, flow rates, pressures, etc. produce stronger and longer lasting polymeric coatings. An operator will typically attempt to achieve these process conditions each time a joint is coated. At later times, an operator of the pipeline may check the performance of the coatings formed by the coating system. Using conventional coating systems, the operator has no way to cross reference poorly performing coatings against the process conditions at which they were actually formed for purposes of improving future coating processes.

SUMMARY

In one aspect, a coating apparatus for coating a perimeter surface of a pipeline comprises a mounting frame configured to be selectively mounted on the pipeline. A sprayer is mounted on the mounting frame and configured to deliver fluid along a flow path oriented toward the perimeter surface of the pipeline when the mounting frame is mounted on the pipeline. The sprayer is selectively switchable between operational modes including a preparation mode in which the sprayer delivers a fluid along the flow path to prepare the sprayer for spraying and a spraying mode in which the sprayer sprays the curable liquid along the flow path in a spray pattern. A fluid diverter is secured to the mounting frame and is selectively movable relative the sprayer between a fluid diverting position in which the diverter is positioned in the flow path to divert the fluid delivered from the sprayer away from the perimeter surface of the pipeline when the sprayer is operating in the preparation mode and a non-diverting position in which the diverter is not positioned in the flow path to permit free flow of the curable liquid from the sprayer in the spray pattern when the sprayer is operating in the spraying mode.

In another aspect, a coating apparatus for coating a perimeter surface of a pipeline comprises a mounting frame configured to be selectively mounted on the pipeline. A sprayer is mounted on the mounting frame and configured to deliver a fluid along a flow path oriented toward the perimeter surface of the pipeline when the mounting frame is mounted on the pipeline. The sprayer is operable in at least one operational mode to deliver the curable liquid along the flow path in a spray pattern. The coating apparatus is configured to move the sprayer circumferentially around the pipeline when the sprayer is operating in said at least one operational mode to coat the perimeter surface with the curable liquid. A vacuum system is operable to impart a vacuum pressure on a space adjacent the flow path to draw a divertible fluid delivered from the sprayer away from said space. An overspray shroud comprises a wall defining a shroud interior and having a sprayer opening and a vacuum opening formed therein. The overspray shroud and the sprayer are fixed in position relative one another such that the sprayer is oriented to deliver fluid along the flow path through the sprayer opening and the shroud wall is oriented to substantially contain the delivered fluid within the shroud interior. The vacuum system is operatively connected to the vacuum aperture to draw the divertible fluid away from the shroud interior.

In another aspect, a method of coating a perimeter surface of a pipeline comprises mounting a sprayer on the pipeline to deliver fluid along a flow path oriented toward the perimeter surface of the pipeline. A fluid diverter is moved to a fluid diverting position in which the diverter is positioned in the flow path. The sprayer is operated in a preparation mode in which fluid delivered to the sprayer to prepare the sprayer for spraying is emitted along the flow path. The fluid delivered by the sprayer operating in the preparation mode is diverted away from the perimeter surface of the pipeline using the diverter positioned in the fluid diverting position. The diverter is moved from the fluid diverting position to a non-diverting position in which the diverter is not positioned in the flow path. The sprayer is operated in a spraying mode in which the sprayer delivers the curable liquid along the flow path in a spray pattern with the diverter positioned in the non-diverting position to coat the perimeter surface of the pipeline.

In yet another aspect, a system for coating a perimeter surface of a pipeline comprises a coating apparatus comprising a sprayer configured to spray curable liquid along a flow path. A frame supports the sprayer and is configured to selectively mount the sprayer on the pipeline to orient the sprayer so the flow path is oriented toward the perimeter surface of the pipeline and to move the sprayer relative to the pipeline to coat the perimeter surface of the pipeline with the curable liquid. A rig located remote from the pipeline comprises one or more containers. Each of the one or more containers contains at least one component of the curable liquid. Plumbing fluidly connects the containers to the sprayer. A pump is fluidly connected to the plumbing to pump the at least one component of the curable liquid from the one or more containers through the plumbing to form the curable liquid and to pump the curable liquid through the sprayer, whereby the sprayer sprays the curable liquid along the flow path. A heater is operatively connected to the plumbing to heat at least one component of the curable liquid. A temperature transmitter is operatively connected to the plumbing to sense a temperature of the at least one component of the curable liquid and to produce a temperature signal representative of the sensed temperature. The temperature transmitter is located at the coating apparatus. A controller is operatively connected to the temperature transmitter and the heater to receive the temperature signal from the temperature transmitter and to adjust the heater based on the received temperature signal to adjust the temperature of the at least at least one component of the curable liquid.

In still another aspect, in a method of controlling the delivery of curable liquid to a sprayer of a coating apparatus, the coating apparatus is configured to selectively mount the sprayer on a pipeline to spray the curable liquid along a flow path oriented toward a perimeter surface of the pipeline and to move the sprayer relative to the pipeline to coat the perimeter surface with the curable liquid. The method comprises pumping at least one component of the curable liquid from a container located remote from the pipeline through plumbing fluidly connecting the container to the sprayer. A temperature signal representative of a temperature of the at least one component of the curable liquid at the coating apparatus is received. A heater operatively connected to the plumbing based on the received temperature signal is adjusted to adjust the temperature of the at least one component of the curable liquid.

In another aspect, in a method of operating a coating apparatus, the coating apparatus comprises a sprayer configured to spray fluid along a flow path and to be selectively switchable between operational modes including a spraying mode in which the sprayer delivers curable liquid along the flow path and a purge mode in which the sprayer delivers a solvent along the flow path to purge the sprayer. The coating apparatus is configured to selectively mount the sprayer on a pipeline to move the sprayer relative to the pipeline while the sprayer is operating in the spraying mode to coat a perimeter surface of the pipeline with the curable polymer. The method comprises detecting a solvent level representative of an amount of solvent in a solvent container from which the sprayer receives the solvent. The detected solvent level is compared to a threshold solvent level. The sprayer is permitted to operate in the spraying mode when the detected solvent level is greater than the threshold solvent level. The sprayer is automatically prevented from operating in the spraying mode when the detected solvent level is less than the threshold solvent level.

In yet another aspect, a method of evaluating a polymeric coating formed on each of a plurality of perimeter joint surfaces of a pipeline comprises storing in a database spray process data about one or more spray process conditions for each of the joint surfaces. The spray process data is received from one or more process sensors of a joint coating apparatus configured to spray each of the perimeter joint surfaces with a curable liquid to form the respective polymeric coating. Said one or more process sensors are configured to detect said one or more spray process conditions while the joint coating apparatus sprays each of the perimeter joint surfaces with the curable liquid. The spray process data for each of the perimeter joint surfaces is associated with joint identity data which identifies the respective perimeter joint surface in the database.

In still another aspect, a rig for use in delivering a curable liquid to a coating apparatus for coating a perimeter surface of a pipeline comprises a housing defining an interior and having a floor. One or more drums are located within the housing. Each of the one or more drums contains a component of the curable liquid. A drum support comprises a base fixedly mounted on the floor of the housing. The base comprises a tray defining a secondary liquid containment cavity. A liquid-permeable platform is configured to support the one or more drums. The platform is slidably mounted on the base to slide relative to the base between a drum loading position and an operational position. The platform extends outside of the interior of the housing when positioned in the drum loading position to receive the one or more drums thereupon. The platform is positioned above the tray when the platform is in the operational position such that any of the at least one components of the curable liquid contained in the one or more drums that leaks onto the platform passes through the platform and into the secondary liquid containment cavity.

In another aspect, a coating apparatus for coating a perimeter surface of a pipeline comprises a mounting frame configured to be selectively mounted on the pipeline. A sprayer has a spray nozzle configured to deliver fluid along a flow path oriented away from the spray nozzle and flaring outwardly in a fan pattern such that the flow path has a width and the width of the flow path increases as a distance of the flow path from the spray nozzle increases. An adjustable sprayer mount mounts the sprayer on the mounting frame for movement relative to the mounting frame. The sprayer mount orients the sprayer so that the flow path is oriented toward the perimeter surface of the pipeline when the mounting frame is mounted on the pipeline and is configured to selectively move the sprayer relative to the mounting frame to adjust a distance between the spray nozzle and the exterior surface of the pipeline to thereby adjust the width of the flow path at a location where the flow path intersects the exterior surface of the pipeline.

In yet another aspect, a coating apparatus for coating a perimeter surface of a pipeline comprises a sprayer configured to deliver a curable liquid along a flow path. A mounting frame is connected to and supports the sprayer and is configured to be selectively mounted on the pipeline to orient the sprayer so that the flow path intersects the perimeter surface of the pipeline. The mounting frame comprises a central bracket having a first end portion, a second end portion, and a width extending between the first and second end portions. A first end bracket is pivotally connected to the first end portion of the central bracket to pivot relative the central bracket around a first pivot axis. A second end bracket is pivotally connected to the second end portion of the central bracket to pivot relative the central bracket around a second pivot axis spaced apart from the first pivot axis. The first and second end brackets are selectively pivotable relative the central bracket between a closed position and an open position. In the closed position, the mounting frame is shaped and arranged for extending circumferentially around at least a portion the pipeline to mount the coating apparatus on the pipeline. In the open position, the mounting frame defines an open gap having a width extending along a gap axis that is wider than the pipeline so that the coating apparatus may be removed from the pipeline with the pipeline passing through the gap along a movement axis generally perpendicular to the gap axis without contacting the mounting frame.

In still another aspect, a coating apparatus for coating a perimeter surface of a pipeline comprises a sprayer configured to deliver a curable liquid along a flow path. A mounting frame is connected to and supports the sprayer and is configured to be selectively mounted on the pipeline to orient the sprayer so that the flow path intersects the perimeter surface of the pipeline. The mounting frame comprises first and second brackets having interlocking end portions. The first and second brackets are selectively movable relative to one another from an open position in which the interlocking end portions are spaced apart from one another to define an open gap sized and arranged to allow the pipeline to pass through the gap and into the mounting frame and a closed position in which the interlocking ends are positioned adjacent to one another such that the mounting frame is sized and arranged to extend circumferentially around the pipeline to mount the coating apparatus on the pipeline. A locking mechanism comprises a retaining member at the interlocking end portion of the first bracket. A locking member is pivotally connected to the interlocking end portion of the second bracket and is sized and arranged for interlocking engagement with the retaining member. The locking member is selectively pivotable around a pivot axis when the first and second brackets are in the closed position from an unlocked position in which the locking member is spaced apart from the retaining member to a locked position in which the locking member interlockingly engages the retaining member to lock the mounting frame in the closed position.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
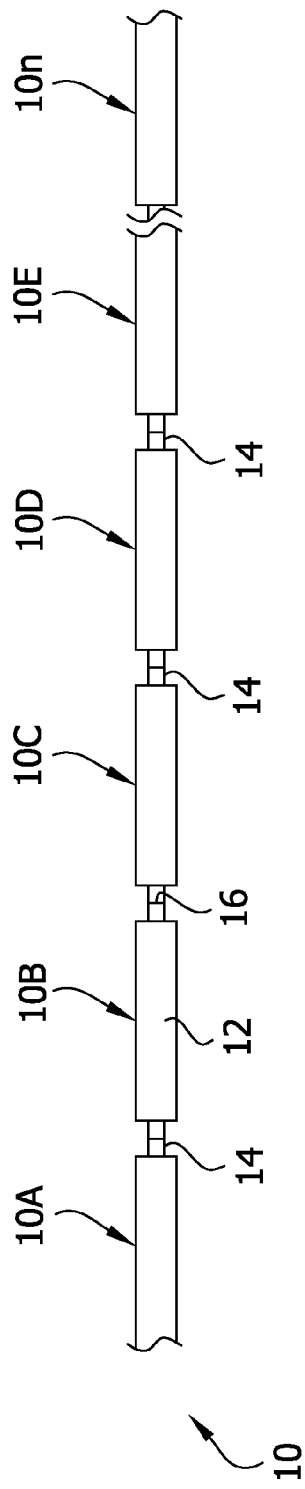
FIG. 1 is a schematic elevation of a pipeline.
Figure 1A:
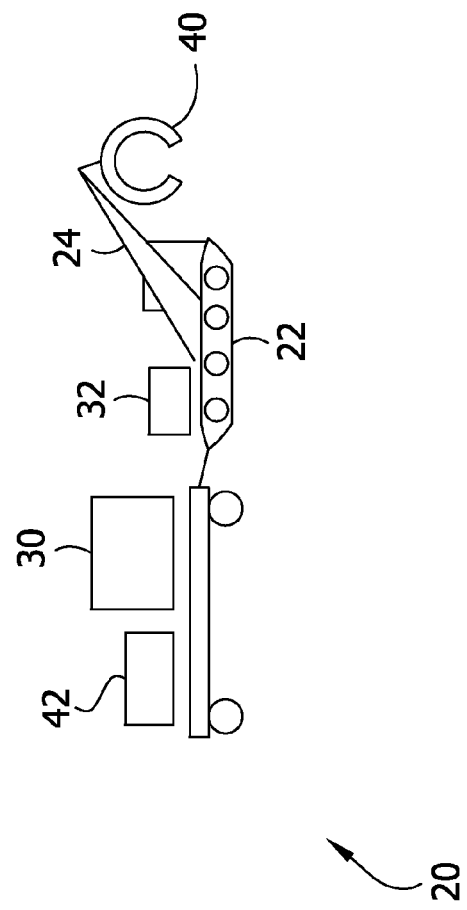
FIG. 1A is a schematic elevation of a coating system.

Referring to FIG. 1, a pipeline such as is commonly used for transporting oil and gas is generally indicated at reference number 10. The pipeline 10 includes separately joined pipe sections 10A-10n that are arranged end to end to form the pipeline. Central portions of each of the pipe sections 10A-10n are coated with an anticorrosion coating 12, but end portions of the pipe sections are uncoated to allow the pipe sections to be joined together to form the pipeline. The thickness of the coating 12 is greatly exaggerated in FIG. 1 so that coated and uncoated portions of the pipeline are easily distinguished. The uncoated end portions of the pipe sections 10A-10n are preferably joined together by girth welds at joints 16. At each of the joints 16, the uncoated end portions of the pipe sections 10A-10n define perimeter joint surfaces 14 that extend between adjacent coatings 12. As shown in FIG. 1, the joint surfaces 14 have direct exposure to environmental conditions, which can cause deterioration of the pipeline 10 if the joint surfaces remain uncoated. As shown in FIG. 1A, a coating system 20 is configured to separately coat each of the exposed perimeter joint surfaces 14 with a polymeric coating to protect the pipeline 10 from environmental conditions. For context, before discussing various aspects of the coating system and joint coating process in further detail, the major components of the coating system 20 and the overall process by which the coating system coats the exposed perimeter joint surfaces 14 of the pipeline 10 will now be briefly summarized.

The illustrated coating system 20 includes a crawler 22 fitted with a crane 24. The crawler 22 is attached to a trailer 26 that supports a rig 30 for processing the components of a curable liquid used to coat the perimeter joint surfaces of the pipeline 10. The crawler 22 supports a generator 32 that is operatively connected to the rig 30 to provide power to the rig. The rig 30 is operatively connected to a coating apparatus 40. The crane 24 supports the coating apparatus 40 and is configured to selectively mount the coating apparatus on the pipeline 10 at each of the joint surfaces 14. As will be discussed in further detail below, the rig 30 is configured to deliver two-components of a curable liquid to the coating apparatus 40. The rig 30 is also configured to deliver a purging fluid such as a solvent to the coating apparatus 40 to purge residual coating liquid from the coating apparatus after the coating apparatus coats each joint surface 14 with the coating liquid. The coating apparatus 40 is configured to mix the two components to from the curable liquid and to spray the curable liquid over the exposed perimeter joint surfaces 14 of the pipeline 10. The trailer 26 supports an air compressor 42 that is operatively connected to the coating apparatus 40. As will be discussed in further detail below, compressed air from the air compressor 42 drives movement of the coating apparatus circumferentially around the pipeline 10 to enable the coating apparatus to spray the curable liquid around the entire circumference of each perimeter joint surface 14. Although FIG. 1 illustrates the major components of one embodiment of a suitable coating system 10, it will be understood that other coating systems can use different components without departing from the scope of the invention.

The general process by which the coating system 20 coats the perimeter joint surfaces 14 of the pipeline 10 begins when the crawler 22 moves the coating system to one of the joint surfaces. The crane 24 is used to mount the coating apparatus 40 on the pipeline 10 at the joint surface 14. A control system executes a control routine to separately deliver the two components of the curable liquid from the rig 30 to the coating apparatus 40 at desired process conditions. The coating apparatus 40 mixes the two components together to form the curable liquid and sprays the curable liquid along a flow path oriented toward the perimeter joint surface 14. The air compressor 42 delivers compressed air to the coating apparatus 40 that drives rotation of the coating apparatus circumferentially around the pipeline. The coating apparatus 40 sprays the curable liquid as it rotates to coat the entire circumference of the perimeter joint surface 14. After coating, the process rig 30 delivers solvent (broadly, flushing fluid) to the coating apparatus 40 to flush the curable liquid and keep the coating system from becoming clogged. As will be discussed in further detail below, the coating system 20 includes a solvent collection system that automatically reclaims the fluid sprayed through the coating apparatus during flushing. After flushing, the crane 24 removes the coating apparatus 40 from the pipeline, and the crawler 22 moves the coating system 20 to the next joint surface 14 where the process is repeated. It will be understood that various steps of the above-described coating process may be modified with departing from the scope of the invention.

Figure 2:
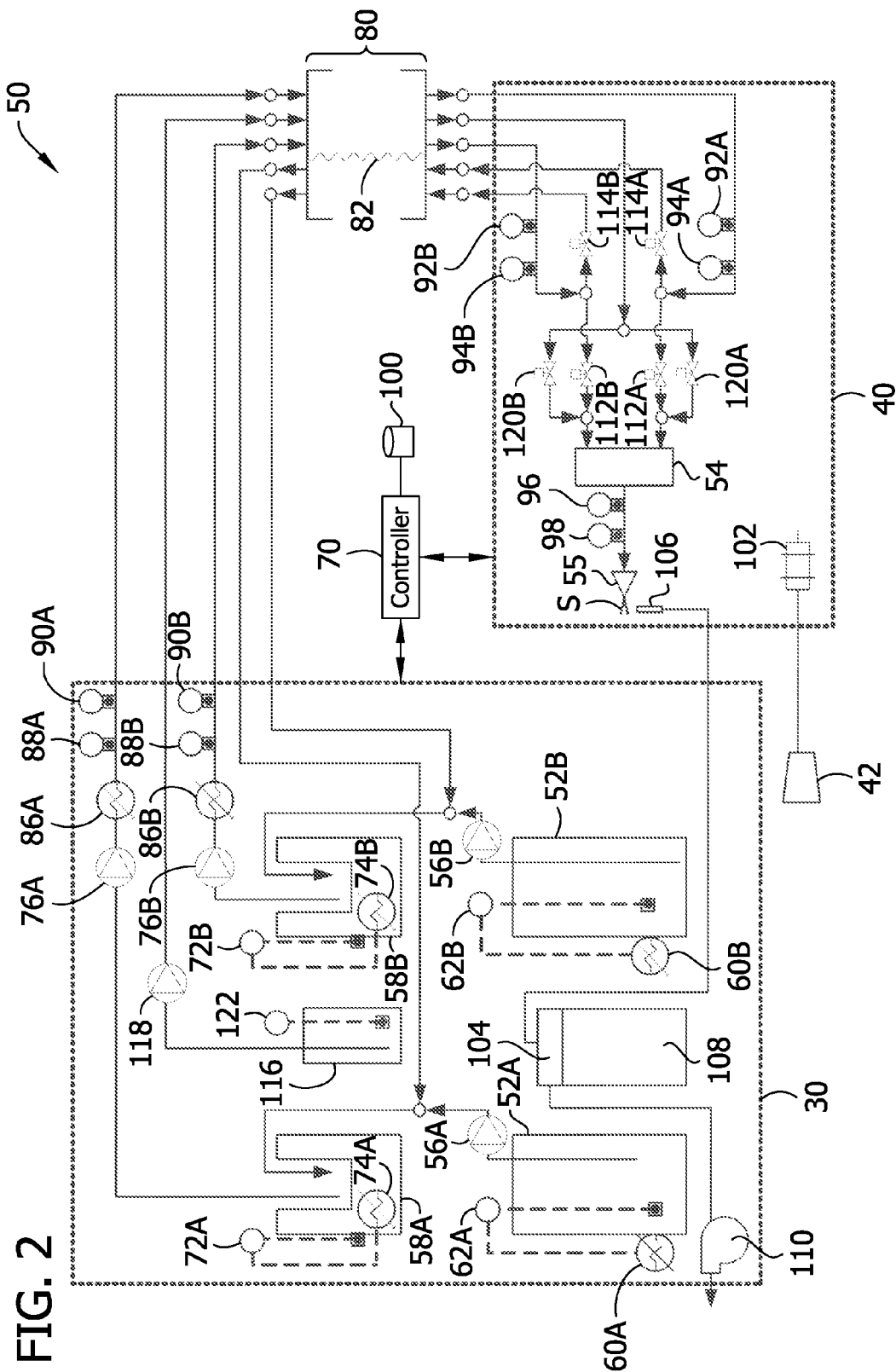
FIG. 2 is a fluid schematic of the coating system.

Before describing the structure of certain exemplary embodiments of the rig 30 and coating apparatus 40, an exemplary embodiment of an automated fluid handling system 50 (broadly, plumbing) that extends from inside the rig onto the coating apparatus will be described in reference to FIG. 2. In the illustrated embodiment the fluid system 50 is configured to form the curable liquid from first and second fluid components, which are stored separately in first and second drums 52A, 52B located in the rig 30. For example, the first component stored in the first drum 52A can be a resin, and the second component stored in the second drum 52B can be a hardener. When the two components are mixed together at a suitable volumetric ratio and at suitable process conditions (e.g., temperatures), they form a curable liquid configured for coating the joint surfaces 14. Although the illustrated embodiment uses a two-part curable liquid, it will be understood that other embodiments can use single-component curable liquids or curable liquids mixed together from more than two components without departing from the scope of the invention.

As will be discussed in further detail below, the fluid system 50 defines first and second parallel flow paths for conveying the first and second components from the first and second drums 52A, 52B to a mixing manifold 54 of the coating apparatus 40. The mixing manifold 54 mixes the first and second components together to form the curable liquid. Throughout this disclosure, components of the coating system 20 that are operatively connected to the first flow path for processing the first component of the curable liquid will be given a reference numeral ending in the letter 'A' and components operably connected to the second flow path for processing the second component will be given a reference numeral ending in the letter 'B.'

As will be discussed in further detail below, the coating system 20 is configured to switch between several operational modes, including the following: a spray buildup mode in which the process rig 30 builds up a sufficiently large flow of curable liquid in a desired temperature range through the coating apparatus to spray the curable liquid in a desired spray pattern S; a spraying mode in which the coating apparatus sprays the curable liquid to coat a perimeter joint surface 14; a recirculation mode in which the coating system 20 recirculates the first and second components of the curable liquid through the fluid system 50; and a purge mode in which the coating system delivers a solvent through the coating apparatus to flush residual curable liquid from the coating apparatus. When the coating system 20 is operating in the spray buildup and spraying modes, it pumps the first and second components into the mixing manifold 54, which mixes the components together to form the curable liquid. The coating system 20 further pumps the curable liquid through a sprayer 55 to spray the perimeter surface 14 of the pipeline. When the coating system 20 is operating in the recirculation mode, it pumps the first and second components through portions of the fluid systems that extend between the rig 30 and coating apparatus 40. But instead of pumping the first and second components through the mixing manifold 54, the coating system recirculates the first and second components. As explained below, the process rig 30 pumps a solvent through portions of the coating apparatus 40 that come in contact with the curable liquid when operating in the purge mode. Various aspects of the coating system 20 that carry out the spray buildup and spraying modes will be described before turning to the recirculation and purge modes.

In the illustrated embodiment, each of the fluid flow paths includes a pump 56A, 56B that pumps the respective component from the drum 52A, 52B to a day tank 58A, 58B. As will be discussed in further detail below, the drums 52A, 52B are replaceable. New drums 52A, 52B replace old drums once the old drums are emptied. A level detector (not shown) can be installed in each of the drums 52A, 52B to detect emptiness. By comparison, the day tanks 58A, 58B are permanently installed in the process rig 30 and are integral and permanent components of the fluid system 50. Though the illustrated embodiment uses replaceable drums 52A, 52B to provide the first and second fluid components to permanent day tanks 58A, 58B, it will be understood that day tanks can be filled with the components of the curable liquid without using replaceable drums without departing from the scope of the invention.

Even though the drums 52A, 52B are replaceable, the fluid system 50 includes automated temperature control for maintaining the temperature of the fluid components contained in the drums. This ensures the drums 52A, 52B deliver the first and second fluid components to the day tanks 58A, 58B at proper temperatures for further processing. Each drum 52A, 52B has a closed loop temperature control system comprising a heater 60A, 60B and a temperature transmitter 62A, 62B. These temperature control components are preferably refitted onto each new drum 52A, 52B as it is installed. The transmitters 62A, 62B are configured to sense the temperature of the fluid components in the drums 52A, 52B and to provide a representative temperature signal to a controller 70. The controller 70 adjusts the heaters 60A, 60B to maintain the fluid components in the drums 52A, 52B at the desired temperatures. In the illustrated embodiment, the controller 70 is a central controller that runs the control logic for several automated systems of the coating system 20.

Throughout this disclosure, various automated processes will be described as being controlled or directed by the central controller 70. That is, the controller 70 acts as a single control module for many of the automated systems of the coating system 20. In other embodiments, local controllers can separately control discrete control loops such as the temperature control loops that implement the heaters 60A, 60B and transmitters 62A, 62B. Alternatively, any of the automated control systems described herein can be replaced with operator control without departing from the scope of the invention.

The controller 70 is configured to operate the pumps 56A, 56B to deliver fluid from the drums 52A, 52B to the day tanks 58A, 58B to maintain a desired fluid level in the day tanks. The day tanks 58A, 58B preferably include level transmitters (not shown) that measure the level of the fluid component contained in each day tank and transmit a respective level signal to the controller 70. The controller 70 uses the level signals to adjust the pumps 56A, 56B to maintain the desired fluid levels in the day tanks 58A, 58B.

Like the drums 52A, 52B, the day tanks 58A, 58B include temperature control for maintaining the fluid components at the desired temperatures. Each day tank 58A, 58B has a temperature control system comprising a respective temperature transmitter 72A, 72B and heater 74A, 74B. The transmitters 72A, 72B are configured to sense and provide a temperature signals representing the temperatures of the first and second fluid components to the controller 70. The controller 70 automatically adjusts the heaters 74A, 74B to maintain the fluid components in the day tanks 58A, 58B at desired temperatures.

Pumps 76A, 76B installed in the process rig 30 are configured to pump the fluid components from the day tanks 58A, 58B through downstream portions of the fluid system 50. The pumps 76A, 76B pump the first and second components from the day tanks 58A, 58B through an umbilical bundle 80 fluidly connecting the process rig to the coating apparatus 40 and further through plumbing at the coating apparatus. The umbilical bundle 80 extends between the rig 30 and the coating apparatus 40 to convey various fluids. In the illustrated embodiment, the umbilical bundle 80 includes a heat trace 82 that can be used to heat the fluids in the umbilical bundle as they flow between the rig 30 and the apparatus 40.

In addition to the pumps 76A, 76B, heaters 86A, 86B are operatively connected to the first and second flow paths at the process rig 30. The heaters 86A, 86B are configured to heat the first and second components to desired temperatures for mixing them together and spraying the curable liquid. When the fluid system 50 is operating in the spraying mode, the controller 70 controls the operation of the pumps 76A, 76B, and heaters 86A, 86B to deliver the first and second components of the curable liquid to the mixing manifold 54 at desired temperatures and desired volume ratios.

The controller 70 receives several inputs that it uses to control the pumps 76A, 76B and heaters 86A, 86B. In the illustrated embodiment, a rig pressure transmitter 88A and a rig temperature transmitter 90A are operatively connected to the first fluid flow path at the process rig 30. Likewise, a rig pressure transmitter 88B and a rig temperature transmitter 90B are operatively connected to the second fluid flow path at the process rig 30. The fluid system 50 also includes an apparatus pressure transmitter 92A and apparatus temperature transmitter 94A operatively connected to the first fluid flow path at the coating apparatus 40. Likewise, the fluid system 50 includes an apparatus pressure transmitter 92B and an apparatus temperature transmitter 94B operatively connected to the second fluid flow path at the coating apparatus 40. The pressure transmitters 88A, 88B, 92A, 92B are configured to sense the pressures of the first and second fluid components at the rig 30 and coating apparatus 40, respectively. The pressure transmitters 88A, 88B, 92A, 92B are operatively connected to the controller 70 to transmit pressure signals representative of the sensed pressures to the controller. The temperature transmitters 90A, 90B, 94A, 94B are configured to sense the temperatures of the first and second fluid components at the rig 30 and coating apparatus 40, respectively. The temperature transmitters 90A, 90B, 94A, 94B are operatively connected to the controller 70 to transmit temperature signals representative of the sensed temperatures to the controller. Preferably, the pumps 76A, 76B or other flow sensors are also operatively connected to the controller 70 to transmit pumped volume signals representative of a volume of the first and second component pumped through the fluid system 50.

The controller 70 is configured to use the pressure signals, temperature signals, and pumped volume signals to adjust the pumps 76A, 76B and heaters 86A, 86B to deliver a desired volume of each of the first and second components to the mixing manifold 54 at a desired back pressure and temperature. In a preferred embodiment, the controller 70 uses a proportional-integral-derivative (PID) control scheme to adjust the operation of the pumps 76A, 76B and the heaters 86A, 86B. The pressure, temperature, and pumped volume signals are inputs that the PID control routine uses to derive outputs that adjust the pumps 76A, 76B and heaters 86A, 86B.

For example, in one or more embodiments, the controller uses the temperature signals to adjust the heaters 86A, 86B to control the temperatures of the first and second fluid components at the mixing manifold 54. In certain embodiments, the controller 70 uses only the temperature signals from the temperature transmitters 94A, 94B to control the heaters 86A, 86B. The controller can also use the temperature signals from both of the temperature transmitters 90A, 94A as inputs in a PID control routine to adjust the heater 86A to maintain the temperature of the first component.

Likewise, the controller can use the temperature signals from one or both of temperature transmitters 90B, 94B to adjust the heater 86B to maintain the temperature of the second component. Transmitters 94A, 94B provide temperature information close to the point of application of the spray to the pipeline 10, where temperature is most critical to the effective application of the coating. Depending upon environmental conditions, there may be a substantial effect upon temperature of the components from the rig 30 to the coating apparatus 40. However, by also monitoring temperature detected at the transmitters 92A, 92B and using their signals in the PID algorithm, temperature can be properly controlled to avoid overheating the components at the rig 30 and damage to the heaters 86A, 86B caused by hunting. Although the signals from the rig temperature transmitters 90A, 90B and the apparatus temperature sensors 94A, 94 be can be used in suitable embodiments, it is also thought that suitable control can be achieved using only the apparatus temperature sensors as control inputs.

The controller 70 can also use the volume signals and pressure signals in controlling the pumps 76A, 76B. In general, the controller 70 controls the pumps 76A, 76B to deliver a desired volumetric ratio of the first and second fluid components to the mixing manifold 54. In addition, the controller 70 controls the pumps 76A, 76B to maintain a desired back pressure in the fluid system 50 so that the curable liquid flows from the sprayer 55 in a desired spray pattern S. The controller 70 may receive user input to control the pumps 76A, 76B to deliver the first and second fluid components to the mixing manifold 54 at the desired ratio. The controller 70 preferably uses the pressure signals from one or both of the pressure transmitters 88A, 92A to adjust the pump 76A to maintain a desired back pressure in the first fluid flow path. Likewise, the controller 70 uses the pressure signals from one or both of the pressure transmitters 88B, 92B to control the pump 76B to maintain a desired back pressure in the second flow path. Like the temperature signals, the controller can suitably use the pressure signals from the rig pressure transmitters 88A, 88B and those from the apparatus transmitters 92A, 92B in a combined control routine that minimizes hunting while accounting for unexpected pressure variation in the fluid system 50 between the pumps 76A, 76B and mixing manifold 54. Alternatively, the controller 70 can use only the pressure signals from the apparatus pressure transmitters 92A, 92B in the control routine.

The pumps 76A, 76B pump the first and second components of the curable liquid through the mixing manifold 54, which mixes them together to form the curable liquid. The pumps further pump the curable liquid through the sprayer 55 to spray the curable liquid in a spray pattern S. A pressure sensor 96 and a temperature sensor 98 sense the pressure and temperature of the curable liquid and provide representative pressure and temperature signals to the controller 70. In the illustrated embodiment, the controller 70 does not use these pressure and temperature signals to control the coating system 20. Rather, the controller provides these and other data about the process to a database 100. As will be explained in further detail below, the database 100 stores the process data so that a user can later cross reference process conditions against the quality of joint coatings to determine if changes should be made to the process.

The coating apparatus 40 is configured to spray the curable liquid over the entire circumference of each perimeter joint area 14. During the spray buildup mode, the coating apparatus 40 builds up the fan-shaped spray pattern S described in further detail below. Once an operator determines that a desired spray pattern S has been achieved, he or she can provide command to the controller 70 to begin the spraying mode. During the spraying mode, the sprayer sprays the curable liquid in the fan-shaped spray pattern S. As the coating system 20 sprays the curable liquid in the spraying mode, the air compressor 42 drives an air motor 102 on the coating apparatus 40 to rotate the coating apparatus around the pipe. The controller 70 controls the motor 102 to time rotation with spraying to form an even coating of curable liquid over the joint surface 14.

The coating system 20 is configured to minimize overspray as it sprays the curable liquid along the flow path. The process rig 30 includes a cyclonic vacuum separator 104 operatively connected to a fluid diverter 106 positioned adjacent the flow path. The structure and operation of a suitable fluid diverter will be described in further detail below in reference to an exemplary embodiment of the coating apparatus 40. Generally, however, the separator 104 draws a vacuum through the fluid diverter 106 to draw fluids near the diverter through the vacuum separator. As will be discussed in further detail below, the diverter 106 is selectively movable from a position that intersects the flow path of the spray pattern S to a position adjacent the flow path. Preferably the diverter 106 is positioned in the flow path during the spray buildup mode to block the curable liquid from contacting the joint surface 14 and to draw the curable liquid into the separator 104. The controller 70 moves out of the flow path during the spraying mode, thereby switching the coating system from the spray buildup mode to the spraying mode. There, the vacuum separator 104 draws overspray away from the joint surface 14 through the diverter 106. The separator 104 delivers liquid and solid particles from the sprayer 55 into a reclamation vessel 108. An exhaust fan 110 exhausts gaseous fluids drawn into the separator 104 out of the process rig 30.

The controller 70 is configured to selectively switch the coating system 20 from the spraying mode to the recirculation mode. In the illustrated embodiment, the coating apparatus 40 includes a spray valve 112A, 112B and a recirculation valve 114A, 114B fluidly connected to the fluid system 50 along each of the first and second flow paths. When the coating system 20 is operating in the spray mode, the spray valves 112A, 112B are open and the recirculation valves 114A, 114B are closed to allow the first and second fluid components to flow from the day tanks 58A, 58B to the mixing manifold 54. But when the coating system 20 switches to the recirculation mode, the controller closes the spray valves 112A, 112B and opens the recirculation valves 114A, 114B. Thus, in the recirculation mode, the pumps 76A, 76B pump the first and second fluid components from the day tanks 58A, 58B, through the umbilical bundle 80 and into the coating apparatus 40. But instead of flowing into the mixing manifold 54, the first and second components flow through the open recirculation valves 114A, 114B, upstream through the umbilical bundle 80, and back into the day tanks 58A, 58B. The recirculation mode, therefore, creates separate closed loop flow paths for each of the first and second fluid components. Fluid in the recirculation flow paths can be heated by the heaters 74A, 74B and 86A, 86B to continue to warm the first and second fluid components. Thus, the recirculation mode can be used to heat the first and second fluid components to a desired temperature before entering the spray buildup or spraying modes.

In the illustrated embodiment, the process rig 30 includes a solvent tank 116. The solvent tank 116 is preferably filled with a solvent suitable for flushing curable liquid from the mixing manifold 54 and spray nozzle 55. The controller 70 is configured to selectively switch the coating system 20 to a purge mode in which the coating system delivers solvent from the solvent tank 116 through the mixing manifold 54 and spray nozzle 55 to flush curable liquid from the fluid system 50. A solvent pump 118 is configured to pump solvent from the solvent tank 116 to the coating apparatus 40 through a solvent flow path, which extends through the umbilical bundle 80. The coating apparatus 40 includes first and second solvent valves 120A, 120B, which selectively fluidly connect the solvent tank 116 to the end portions of the first and second flow paths, near the mixing manifold. Alternatively, a single solvent valve could be used, which selectively fluidly connects the solvent tank directly to the mixing manifold. The controller 70 is operatively connected to the solvent valves 120A, 120B to switch the coating system 20 to the purge mode by opening the solvent valves and closing the spray valves 112A, 112B.

The controller 70 causes the pump 118 to pump solvent into the coating apparatus. Some of the solvent flows through the first solvent valve 120A and into the portion of the mixing manifold 54 through which the first component of the curable liquid flows in the spraying mode. Another portion of the solvent flows through the second solvent valve 120B and into the portion of the mixing manifold 54 through which the second component of the curable liquid flows in the spraying mode. The two portions of the solvent mix in the mixing manifold 54 just as the first and second fluid components do in the spraying mode. The solvent pump 118 continues to pump the mixed solvent through the coating apparatus until it passes through the sprayer 55. Thus, it can be seen that, during the purge mode, the fluid system 50 fluidly connects the solvent in the solvent tank 116 to the portion of the plumbing that carries the curable liquid so that the solvent pump 116 can pump the solvent through the plumbing to flush the coating system 20 of curable liquid contained therein.

As explained in further detail below, the controller 70 is preferably configured to automatically cause the coating system 20 to enter the purge mode after each perimeter joint surface is coated with the curable liquid. In one or more embodiments, the coating apparatus 40 remains mounted on the pipeline 10 with the sprayer 55 oriented toward the perimeter joint surface while the coating system flushes the solvent through the coating apparatus. To prevent the solvent from contacting the freshly coated perimeter joint surface 14, the coating apparatus 40 is configured to move the fluid diverter 106 into the solvent flow path F. The vacuum separator 104 draws the solvent and flushed curable liquid into the reclamation vessel 108, and the exhaust fan 110 exhausts gaseous fluids away from the coating system 20.

Generally, it is desirable to flush the coating system 20 of curable liquid contained therein after each use. If curable liquid is not flushed shortly after spraying, it can cure in the fluid system 50 and form obstructions. In the illustrated embodiment, a level sensor 122 is operatively connected to the solvent tank 116 to prevent the coating system 20 from spraying curable liquid when the solvent tank is empty. The level sensor 122 detects a solvent level in the solvent tank to determine an amount of solvent therein. The level sensor 122 is operatively connected to the controller 70 to provide a level signal representative of the detected amount of solvent in the tank 116. The controller 70 is configured to compare the detected solvent level with a threshold (e.g., a threshold amount of solvent equal to an amount of solvent needed to flush the coating system 20 of curable liquid in the purge mode) before operating the coating system in the spraying mode. If the detected solvent level is greater than the threshold, the controller 70 permits the coating system 20 to operate in the spraying mode. If the detected solvent level is less than the threshold, the controller 70 automatically prevents the coating system 20 from operating in the spraying mode until solvent is added to the tank 116. For example, the controller can force the coating system 20 into the recirculation mode until the solvent level exceeds the minimum threshold. Moreover, a suitable notification of a low solvent level can be caused to be given by the controller 70.

Figure 3:
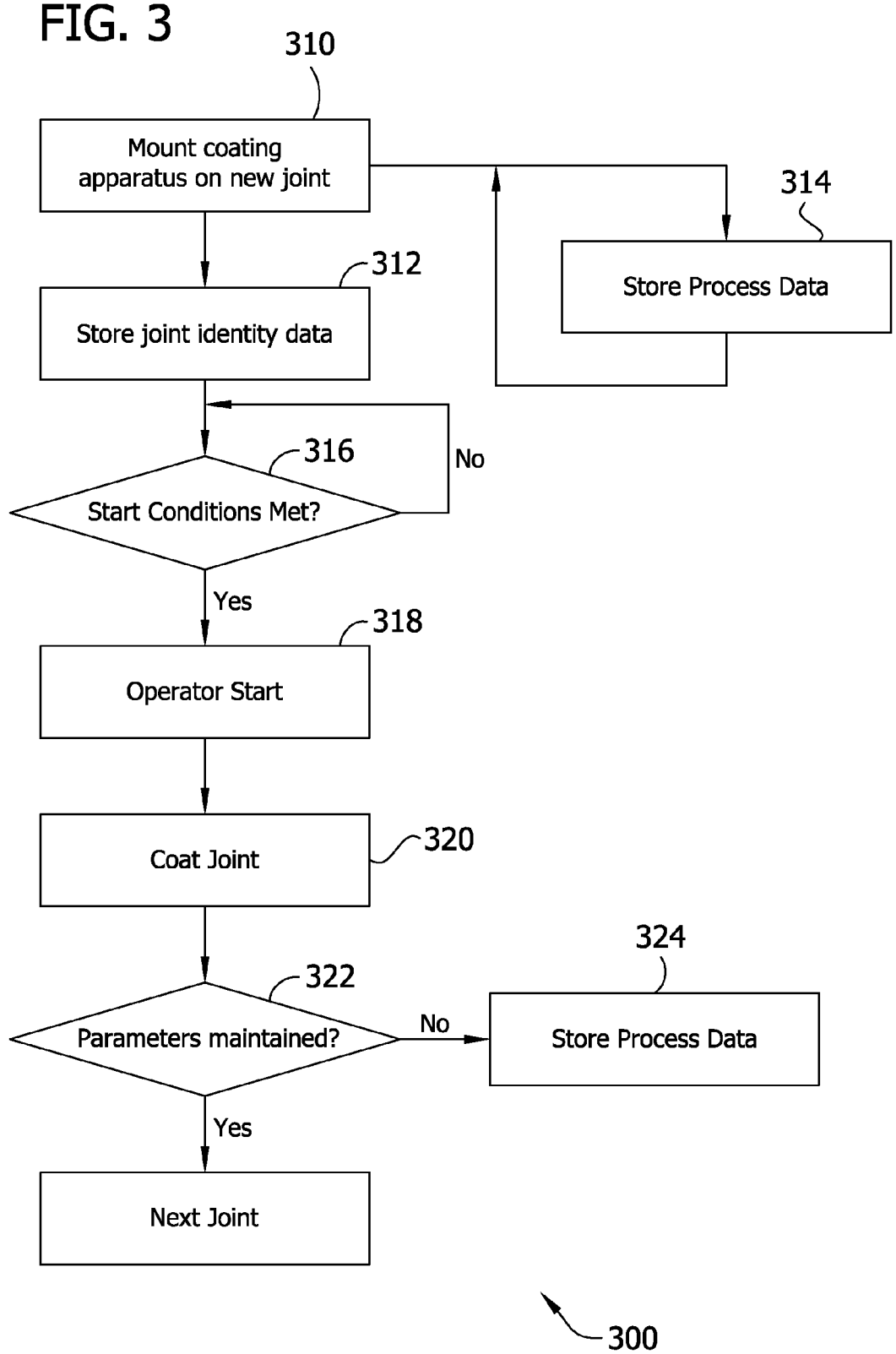
FIG. 3 is a flowchart illustrating the steps and decision blocks of a method of coating a joint.

Referring to FIG. 3, an exemplary method 300 of operating the coating system 20 to coat a perimeter joint surface 14 with curable liquid will now be described. The method 300 begins at step 310 when the coating apparatus 40 is mounted on the pipeline at an uncoated perimeter joint surface 14. Once mounted the coating system 20 stores joint identity data about the joint surface 14 it is about to coat. The joint identity data identifies the joint surface 14 and distinguishes the joint surface from other joint surfaces in the pipeline 10. Suitable joint identity data include global positioning system coordinates for the joint surface 14, an applicator identifier such as the name of one or more operators of the coating system 20, application time that identifies the date and time at which the curable liquid is sprayed onto the joint surface, etc.

In addition to storing joint identity data, at step 314 the coating system stores process data on the database 100. In one or more embodiments, the process data includes temperature data, pressure data, pumped volume data, valve position data, etc. from the various component devices used in the coating system 20 and described above. Preferably, the coating system 20 stores process data continuously throughout the execution of the method 300 at intervals of, for example about ten seconds. The coating system associates the process data with the joint identity data. Then later, the joint coating process conditions can be evaluated by comparing the performance of the joint coatings with the recorded process conditions at which the joints were formed.

Preferably, when the coating apparatus 40 is initially mounted on the pipeline 40 at the joint surface 14, the coating system 20 begins to operate in the recirculation mode. As the coating system 20 operates in the recirculation mode, the coating system checks to determine whether all start conditions have been met at decision block 316. For example, in one or more embodiments, the coating system checks to ensure there are sufficient amounts of the first and second fluid components in the drums 52A, 52B and day tanks 58A, 58B. As described above, the coating system 20 also checks to determine whether the solvent level exceeds a minimum threshold at step 316. The coating system 20 can also, at step 316, determine whether the first and second fluid components flowing through the fluid system 50 in the recirculation mode are at the desired temperatures and pressures. In certain embodiments, the coating system also determines whether the cyclonic vacuum separator 104 is turned on and whether the coating apparatus 40 is securely mounted on the pipeline 10 before proceeding to the spraying modes.

Once the coating system 20 determines that the necessary conditions for spraying have been met at step 316, it provides an indication to an operator that the system is ready for spraying. At step 318 the operator responds to the indication with a command to begin spraying the perimeter joint surface 14, and the coating system 20 switches to the spray mode and coats the joint (step 320). It is to be understood that switch to the spray mode could be carried out automatically. The joint coating step 320 includes the spray buildup mode, spraying mode, and purge mode and is more fully described below in reference to the method 400 of FIG. 4. As the coating system 20 carries out step 320, it continuously monitors various parameters such as fluid temperature, back pressure, pumped volumes, etc. (decision block 322). If the monitored parameters are not properly maintained, the coating system 20 notifies the operator at step 324. If the system 20 maintains the monitored parameters throughout the joint coating step 320, at step 326 the joint coating process is completed. The crane 24 removes the coating apparatus 40 from the pipeline 10 and the crawler 22 moves the coating system 20 to the next perimeter joint surface 14.

Figure 4:
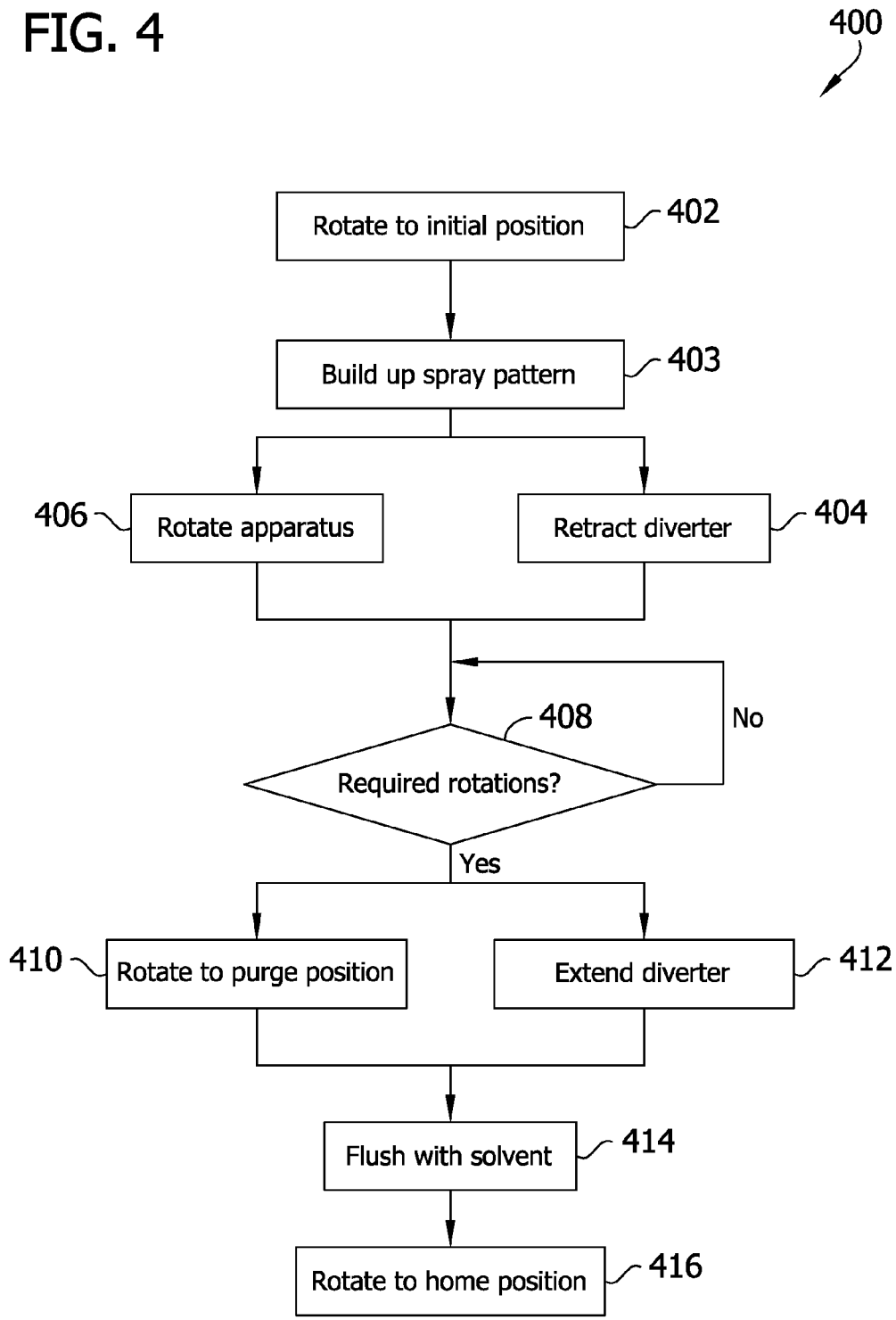
FIG. 4 is a flow chart illustrating the steps and decision blocks of a method carrying out one of the steps of the method of FIG. 3.

Referring to FIG. 4, an exemplary method of coating a joint 400 is suitable for being run during the joint coating step 320 of the method 300. Thus, once the coating system 20 receives the start command from the operator, the air motor 102 rotates the coating apparatus 40 around the circumference of the pipe to an initial position (step 402). With the fluid diverter 106 positioned in front of the sprayer 55, the coating system 20 begins to build up the spray pattern S (step 403). The coating system 20 sprays the curable liquid with the diverter 106 positioned in front of the sprayer 55 until the pressure in and flow rate through the sprayer achieves the desired spray pattern S (e.g., a fan pattern that has a width that increases along with a distance from the sprayer). Once the desired spray pattern is achieved, the coating system 20 retracts the diverter 106. With the diverter 106 retracted, the flow path is oriented toward the exposed perimeter joint surface 14 (step 404). At step 406 the air motor 102 begins to rotate the coating apparatus 40 around the circumference of the pipeline 10 (step 406).

At decision block 408, the coating system determines whether the coating apparatus 40 has rotated around the pipeline 10 a number of rotations required to achieve the desired coating thickness. The coating system 20 continues to spray the curable liquid along the flow path while rotating the apparatus 40 around the pipeline 10 until the desired number of rotations is reached. Then, the coating system 20 stops spraying the curable liquid. After the spraying mode has ended, at step 410, the coating apparatus rotates to a predefined purge location; and at step 412, the coating apparatus extends the diverter 106 into the flow path. At step 414, the coating system 20 switches to the purge mode and pumps solvent through the mixing manifold 54 and sprayer 55 to flush the coating apparatus 40 of curable liquid. Once flushing is complete, the motor 102 rotates the coating apparatus 40 to a home position suitable for removing the coating apparatus from the pipeline 10.

It will be understood that the illustrated coating system 20 has automated many of the steps of the methods 300 and 400 using the controller 70. Although the controller 70 automatically executes various steps of the coating methods 300, 400 in the illustrated embodiment, in other embodiments the steps of the methods can be performed manually without departing from the scope of the invention. Moreover, other embodiments can implement a coating method using different sequences of steps without departing from the scope of the invention.

Figure 5:
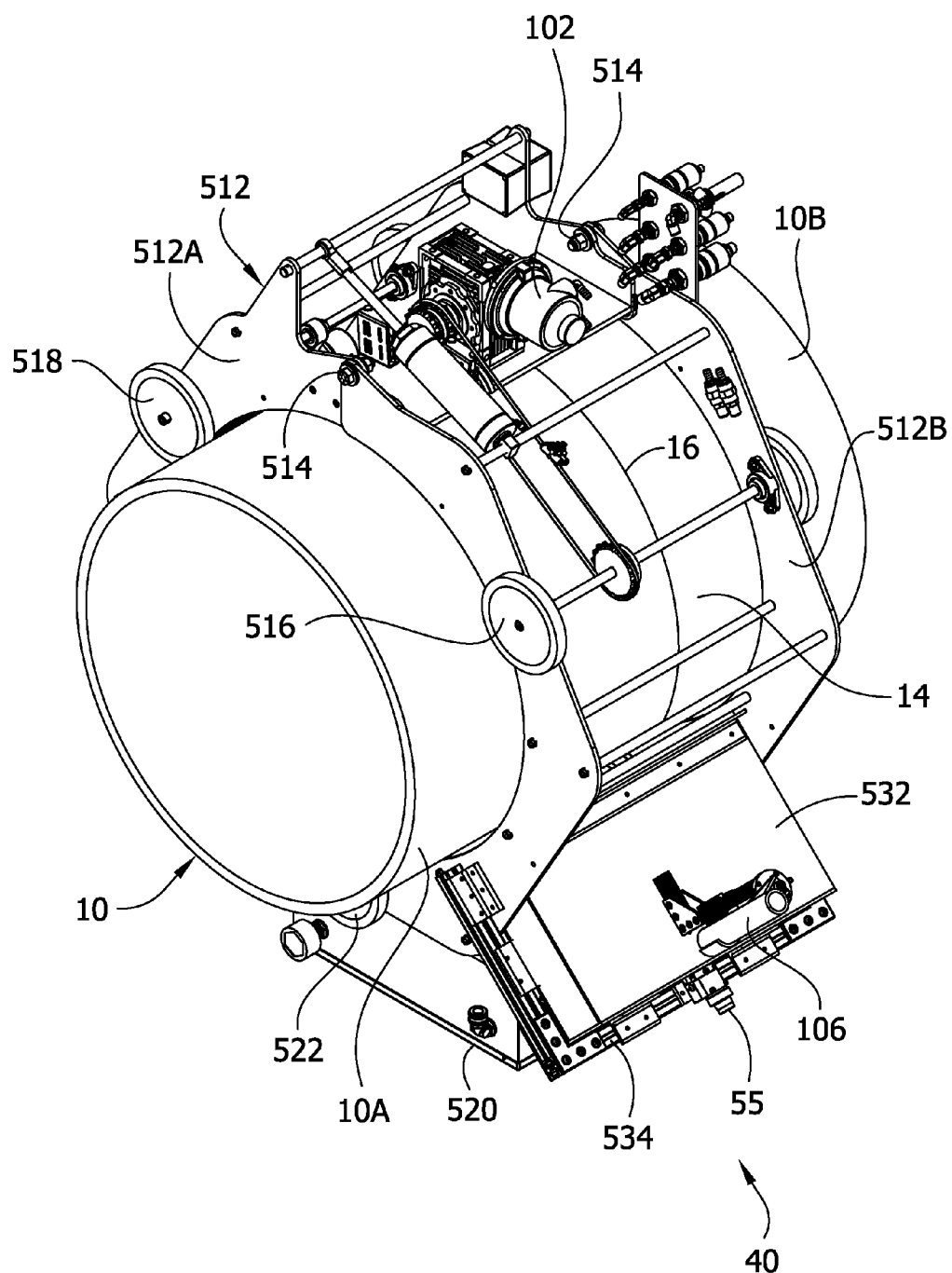
FIG. 5 is a perspective of a coating apparatus of the coating system of FIG. 1 secured to the pipeline.

Having described the coating system 20 at a system level, reference is now made to FIG. 5, which depicts various aspects of an exemplary coating apparatus 40 in greater detail. The coating apparatus 40 is shown mounted on the pipeline 10 to coat the exposed perimeter surface 14 of the pipe sections 10A, 10B across the girth weld 16. The coating apparatus 40 includes a mounting frame 512 configured to be selectively mounted on the joined end portions of the pipe sections 10A, 10B for rotation about the longitudinal axis of the pipeline 10. The mounting frame 512 includes first and second brackets 512A, 512B that are selectively pivotable about a hinged connection 514 from an open position (not shown) to a closed position in which the brackets are shaped and arranged for extending around the circumference of the pipeline 10. The coating apparatus includes two pairs of drive wheels 516, 518 and the air motor 102. The air motor 102 receives compressed air routed from the air compressor 42 through a pneumatics control box 520. The air motor 102 uses the compressed air to drive rotation of the drive wheels 516, 518 to rotate the coating apparatus 40 circumferentially around the pipeline 10. Other types of drive motors can also be used without departing from the scope of the invention. The drive wheels 516, 518 and a third pair of wheels 522, which are not driven, contact the exterior of the pipeline 10 to guide the apparatus 40 on the pipeline as it rotates.

In a preferred embodiment, the coating apparatus 40 can rotate at least one complete revolution around the circumference of the pipeline. In an exemplary embodiment, the controller 70 communicates with the drive motor 102 to automatically direct the motor to rotate the coating apparatus 40 around the pipeline 10. The coating apparatus 40 sprays a curable liquid on the exposed perimeter surface 14 of the pipeline 10 as the apparatus rotates to coat the joined end portions of the pipe sections 10A, 10B.

Figure 6:
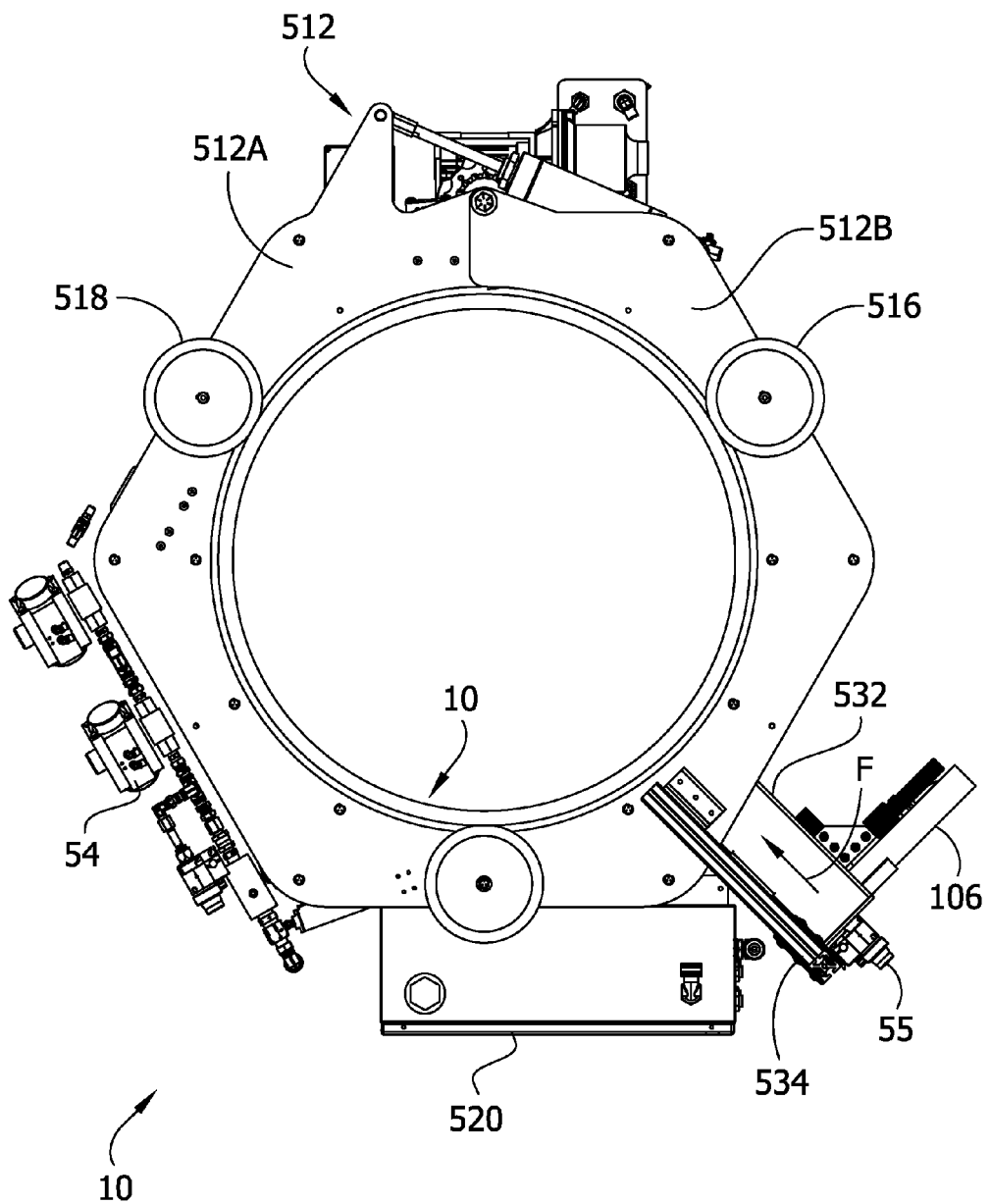
FIG. 6 is a front elevation of the coating apparatus with an overspray shroud wall removed.

Referring to FIGS. 5 and 6, the sprayer 55 is mounted on the mounting frame 512 and configured to deliver fluid along the flow path F toward the exposed perimeter surface 14 of the pipeline 10. In one suitable embodiment, the sprayer is a GRACO AL Series Automatic Sprayer, available from GRACO Inc. of Minneapolis, Minn. In other embodiments, the coating apparatus uses other sprayers without departing from the scope of the invention. As shown in FIG. 5, a shroud 532 substantially surrounds the spray pattern S to prevent overspray. In FIG. 6, the shroud 532 has been partially broken away to reveal a flow path F of the spray and show more of the sprayer 55.

Figure 7:
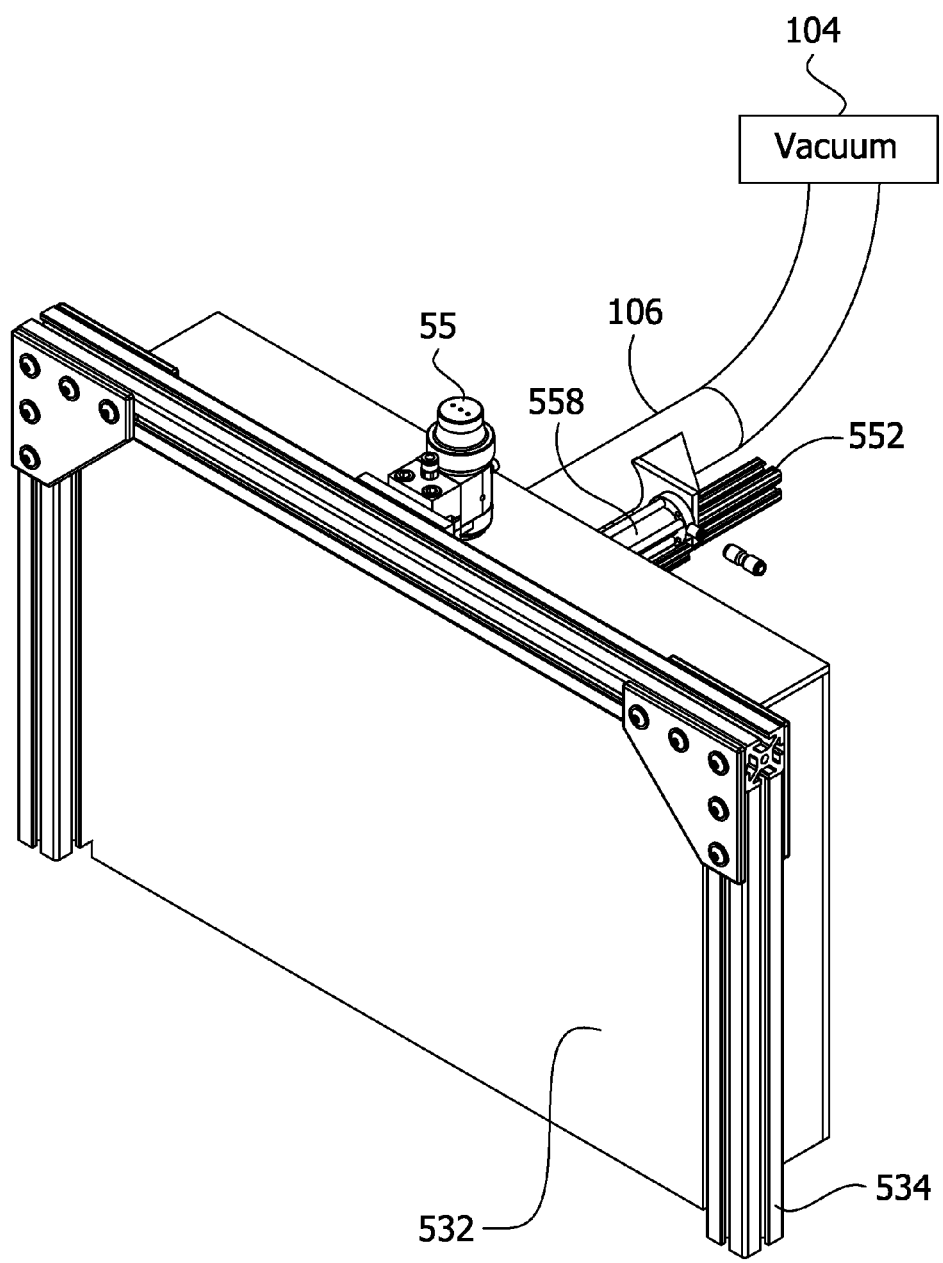
FIG. 7 is an enlarged perspective of a dispensing subsystem of the coating apparatus including the overspray shroud, a sprayer, and a diverter.
Figure 8:
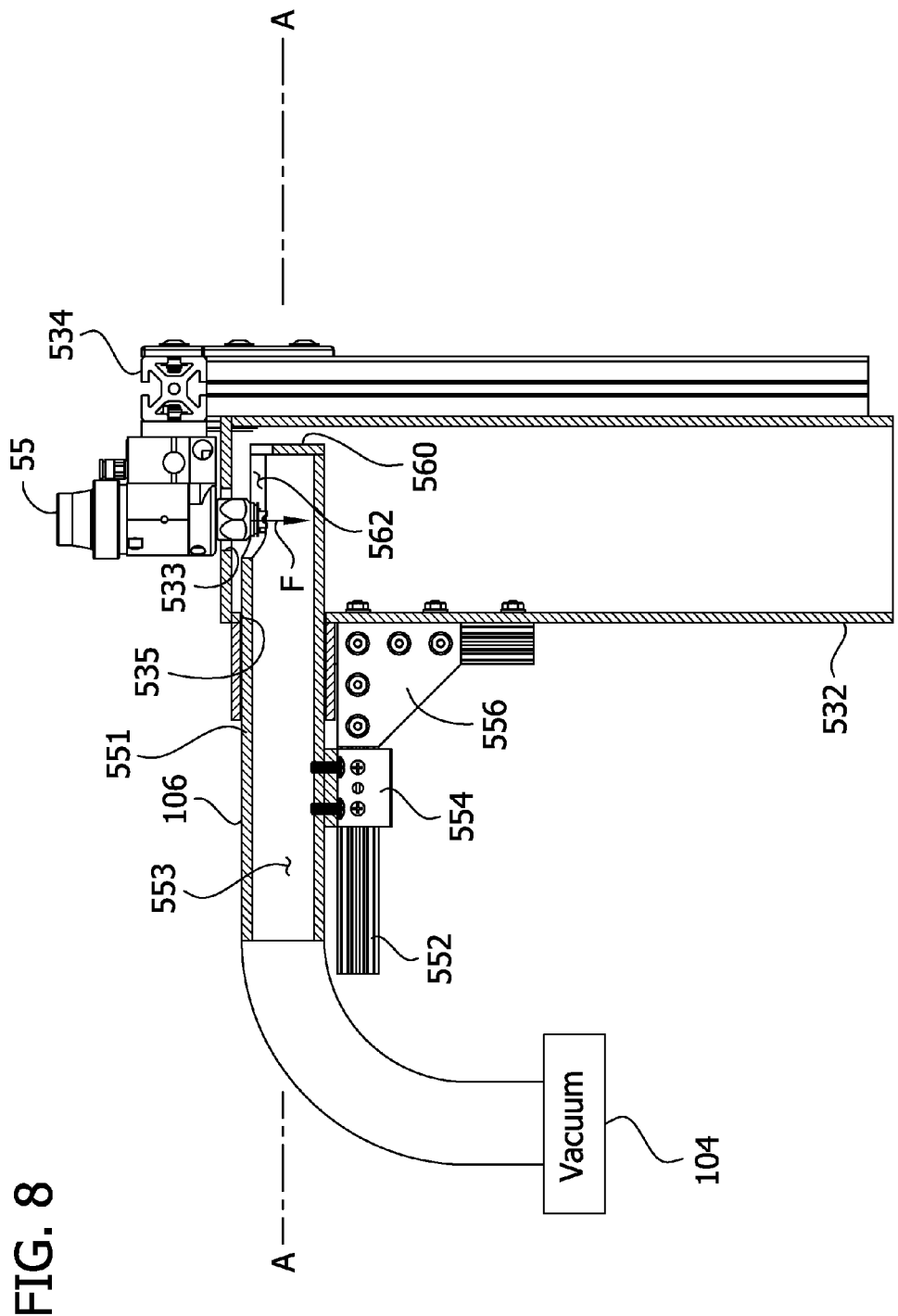
FIG. 8 is an enlarged fragmentary cross section illustrating the components shown in FIG. 7 and depicting the diverter positioned in a fluid diverting position.
Figure 9:
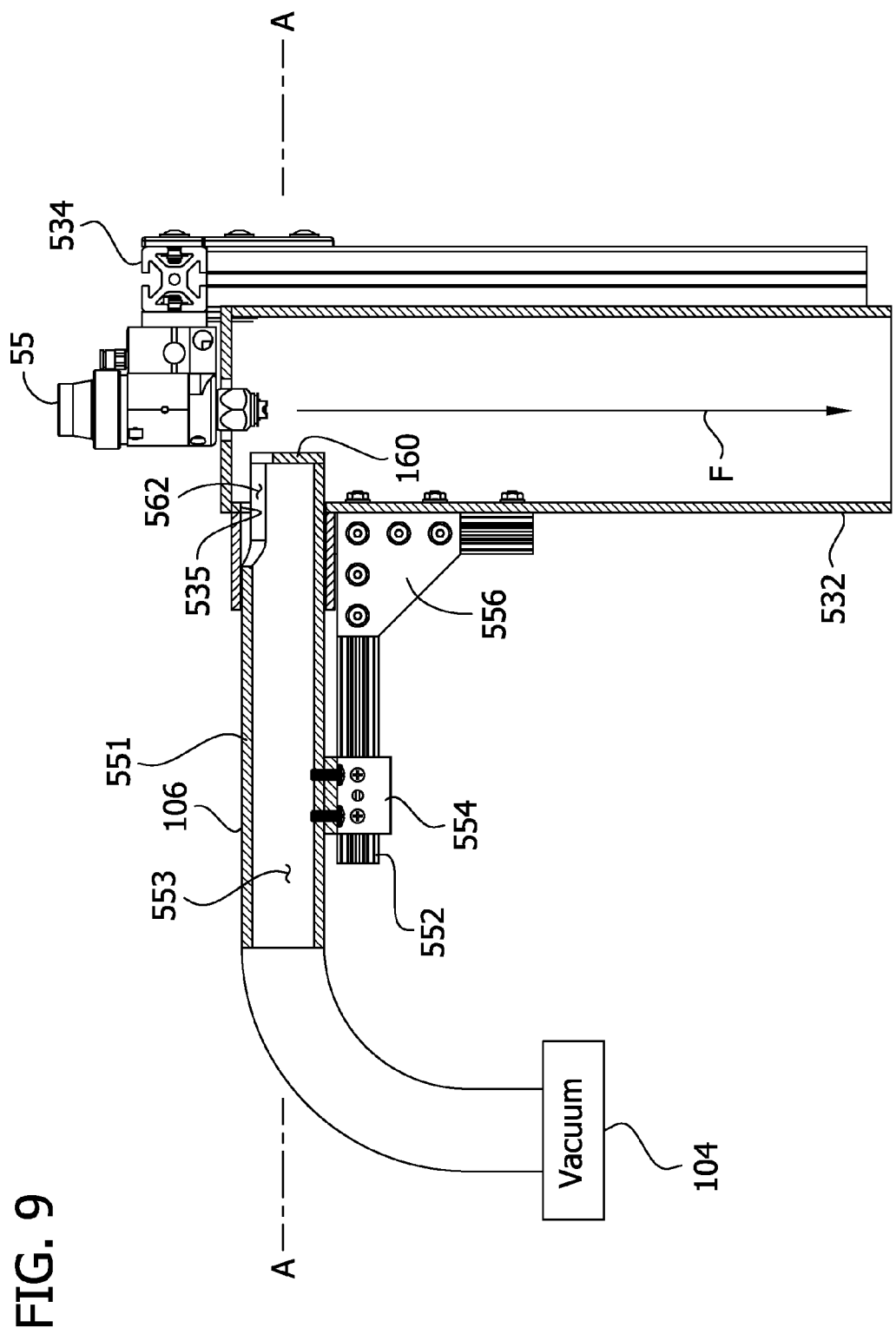
FIG. 9 is an enlarged fragmentary cross section similar to FIG. 8 illustrating the diverter positioned in a non-diverting position.

Referring to FIGS. 7-9, the overspray shroud 532 includes a shroud wall surrounding the flow path F and defining a shroud interior. The shroud 532 has an open bottom (as the shroud is oriented in FIGS. 4-6) that permits spray to pass out of the shroud onto the pipeline 10. The shroud wall 532 defines a sprayer opening 533 and a vacuum/diverter opening 535. The overspray shroud 532 and the sprayer 55 are fixed in position relative one another such that the sprayer is oriented to deliver fluid along the flow path F through the sprayer opening 533. The wall of the shroud 532 is shaped and arranged to substantially contain the delivered fluid within the shroud interior. The sprayer opening 533 is aligned with the sprayer 55 and flow path F so that the sprayer delivers fluid along the flow path through the sprayer opening. As will be discussed in further detail below, the vacuum/diverter opening 535 is sized to receive the diverter 106 for selectively obstructing fluid flow along the flow path F. Likewise, the vacuum/diverter opening 535 is shaped and arranged to couple the shroud interior to a vacuum pressure that draws overspray out of the interior of the shroud. The terms "vacuum opening" and "diverter opening" will be used interchangeably to refer to the vacuum/diverter opening 535 throughout this disclosure.

As shown in FIGS. 5 and 6 mounting bracket 534 fixedly mounts the sprayer 55 on the second mounting frame 512. When the coating apparatus 40 is mounted on the pipeline 10, the sprayer 55 does not move relative to the apparatus. Moreover, when the coating apparatus 40 is mounted on the pipeline 10, the flow path F is oriented in a fixed direction relative to the apparatus and moves conjointly with the apparatus. As will be discussed below, the sprayer 55 is configured to selectively switch between different operational modes in which the sprayer delivers different types of fluid along a flow path F. In each of the operational modes, the flow path F is oriented toward the exposed perimeter surface 14 of the pipeline 10. But in different operational modes, the sprayer 55 can, in some embodiments, deliver fluids along the flow path F in different dispensing patterns. For example, in at least one operational mode, the sprayer 55 delivers fluid along the flow path F in a spray pattern S in which the delivered fluid fans out across the entire axial length of the perimeter surface 14 between the coatings 12 (FIG. 1) so that the pipe sections are continuously coated after spraying is complete.

Preferably, the shroud 532 is shaped and arranged to be spaced apart from the fluid the sprayer 55 delivers along the flow path F. Thus in the illustrated embodiment, the shroud 532 is shaped like a long and narrow box to allow for substantially unobstructed spray of the coating liquid along the flow path F in a wide, fan-like spray pattern which spans the length of the exposed perimeter surface 14 of the pipeline 10. As discussed above, the sprayer 55 may require a fan buildup mode to build sufficient fluid flow to achieve the desired spray pattern. In addition to the spray pattern, it is understood that the sprayer 55 can deliver fluids along the flow path F with different dispensing patterns.

Referring again to FIGS. 5-6, the sprayer 55 is configured to deliver different types of fluid along the flow path F depending on the operational mode. As discussed above, the apparatus 40 includes the mixing manifold 54 for mixing together fluids of different types before delivering them through the sprayer 55. In the drawings, the coating apparatus 40 is shown with the hoses that connect the mixing manifold 54 and sprayer 55 removed for clarity. The mixing manifold 54 is operatively connected to a plurality of fluid sources, such as the day tanks 58A, 58B and solvent tank 116. The mixing manifold 54 can also be connected to other fluid sources without departing from the scope of the invention. As discussed above, the process rig 30 pumps curable liquid components and solvent through the mixing manifold 54 and sprayer 55. In other embodiments, it is contemplated that the coating apparatus could, instead, use a local pump system and/or local fluid containers without departing from the scope of the invention.

As discussed above, the spraying system is configured to switch between several operational modes, including a spraying mode. The coating apparatus 40 is configured to operate in the spraying mode to deliver the curable liquid in a spray pattern along the flow path F to coat the exposed perimeter joint surface 14 of the pipeline 10. As the sprayer 55 sprays the curable liquid, the motor 120 drives apparatus 40 in rotation around the circumference of the pipeline 10 so that the sprayer delivers a substantially uniform coating over the exposed perimeter surface 14. In a preferred embodiment, the controller 70 sequences the operation of the sprayer 55 in the spraying mode with the operation of the drive motor 102 to cover the exposed perimeter surface 14 with a substantially uniform coating of curable liquid material, which cures to form an anticorrosion coating on the pipeline 10.

Operational modes other than the spraying mode in which fluid flows through the sprayer 55 can generally be referred to as "preparation modes" because they each are used to prepare the coating apparatus for operating in the spraying mode at some future time. For example, in the purge mode, the coating system 20 prepares the sprayer 55 for spraying by flushing residual curable liquid from the sprayer. Likewise, in the spray buildup mode, the coating system 20 prepares the sprayer 55 for spraying by building up a fan pattern suitable for coating the joint surface 14 with the curable liquid. In either of these uses of the preparation mode, the sprayer 55 delivers fluid, such as solvent or curable liquid that is not used in coating the pipeline 10 along the flow path F. Because the sprayer 55 is fixed in position relative to the mounting frame 512, the sprayer directs the fluid toward the perimeter surface 14 of the pipeline 10 in the preparation mode just as in the spraying mode. The application of fluid to the perimeter surface 14 of the pipeline 10 either before or after spraying the pipeline with the curable liquid can damage the resulting coating. As discussed below, in the preparation mode, the coating apparatus 40 is configured to divert the fluid away from the exposed surface 14 of the pipeline 10 to prevent damage to the coating.

Referring to FIGS. 8 and 9, the fluid diverter 106 is configured to divert fluid dispensed along the flow path F in the preparation mode. The fluid diverter 106 is movably secured to the mounting frame 512. In the illustrated embodiment, the fluid diverter 106 is movable relative to the sprayer 55 between a fluid diverting position (FIG. 8) and a non-diverting position (FIG. 9). In the fluid diverting position, the diverter 106 intersects in the flow path F to divert the fluid away from the perimeter surface 14 of the pipeline 10. The controller 70 preferably automatically positions the fluid diverter 106 in the fluid diverting position when the sprayer 55 operates in the preparation mode. In the non-diverting position shown in FIG. 9, the diverter 106 is spaced apart from the flow path F to permit free flow of fluid from the sprayer toward the exposed perimeter surface 14. The controller 70 preferably automatically positions the diverter 106 in the non-diverting position when the sprayer 55 operates in the spraying mode to permit free flow of the curable liquid to the perimeter surface 14.

In the illustrated embodiment, the diverter 106 is movable along a diverter movement axis A between the fluid diverting and non-diverting positions. It will be understood, that a fluid diverter may be movable in other ways (e.g., by pivoting, etc.) without departing from the scope of the invention. The diverter movement axis A extends transverse (e.g., generally perpendicular) to the flow path F. The diverter 106 extends through the diverter opening 535 in the side wall of the shroud 532 and moves along the movement axis A through the opening between the fluid diverting and non-diverting positions. In both the fluid diverting and non-diverting positions, the inner axial end of the diverter 106 is positioned within the interior of the shroud 532.

In the illustrated embodiment, the coating apparatus 40 includes a diverter guide 552 oriented parallel to the diverter movement axis A. The diverter guide 552 defines a guide channel, and a slide 554 is slidingly received in the guide channel. The diverter 106 is mounted on the slide 554 and is thereby received in the diverter guide 552 for movement along the diverter movement axis A. In the illustrated embodiment, a mounting bracket 556 fixedly mounts the diverter guide 552 on the overspray shroud 532. A pneumatic cylinder 558 (FIG. 7) that is mounted on the shroud 132 operatively connects the diverter 106 to the diverter guide 552 to move the diverter through the diverter guide along the diverter movement axis A between the fluid diverting and non-diverting positions. Preferably, the controller 70 is operatively connected to the pneumatic cylinder 558 to time actuation of the cylinder to automatically position the diverter 106 in the fluid diverting position during the preparation mode and in the non-diverting position during the spraying mode.

Although a diverter can have any suitable shape without departing from the scope of the invention, the illustrated diverter 106 is tube-shaped. The diverter 106 has inner and outer axial ends and an annular side wall 551 extending along a longitudinal axis oriented parallel to the diverter movement axis A. The side wall 551 of the diverter 106 defines a lumen 553. An inner axial end wall 560 bounds an inner end of the lumen 553, and the lumen extends through the open outer axial end of the diverter 106. As shown in FIG. 6, an aperture 562 is formed in the side wall of the diverter 106 adjacent the inner axial end wall 560. When the diverter 106 is positioned in the fluid diverting position as shown in FIG. 8, the aperture 562 is positioned in the flow path F and opposes the sprayer 55 such that the fluid delivered from the sprayer is delivered through the aperture and into the lumen 553. Thus, in the fluid diverting position, the illustrated diverter 106 collects diverted fluid in the interior lumen 553.

Referring again to FIGS. 8 and 9, in a preferred embodiment, the diverter 106 is operatively connected to the cyclonic vacuum separator 104 (broadly, a vacuum system), which is adapted to draw a vacuum through the interior lumen 553 of the tube. The vacuum system 104 can be a vacuum pump or other apparatus that is mounted on the mounting frame 512 or is located remote from the pipeline 10. The vacuum system 104 is preferably operatively connected to the open outer end of the diverter 106 to impart a vacuum pressure on the interior lumen 553. When the diverter 106 is positioned in the fluid diverting position and the sprayer 30 is operating in the preparation mode, the vacuum pressure is operative to draw the diverted fluid through the tube. The fluid flows along a first portion of the fluid flow path F, through the aperture 562, and into the diverter lumen 553, where the vacuum pressure draws the fluid out of the diverter 106 and into the vacuum system 104. As discussed above, the vacuum separator 104 deposits liquid and solid particles in a reclamation vessel 108 and the exhaust fan 110 exhausts gaseous fluids away from the coating system 20.

In a preferred embodiment, the vacuum system 104 is also operative to draw any overspray of curable liquid away from the interior of the shroud 532 during the spraying mode. As discussed above and illustrated in FIG. 6, when the cylinder 558 moves the diverter 106 to the non-diverting position, the inner axial end of the tube extends through the diverter opening 535 in the shroud 532 and into the shroud interior. Preferably, the diverter 106 is shaped and arranged in the non-diverting position so that the aperture 562 is located within the interior of the shroud 532. The vacuum system 104 is operative to draw overspray of the curable liquid through the aperture 562, into interior lumen 553 of the diverter 106, and away from the shroud interior. The vacuum separator 104 deposits liquid and solid particles in the reclamation vessel 108 and the exhaust fan 110 exhausts gaseous fluids away from the coating system 20.

As can be seen, the illustrated embodiment employs a dual purpose diverter 106 that functions to draw in overspray during the spraying mode. It will be understood that in other embodiments, the vacuum system may impart a vacuum pressure on a space adjacent the flow path to draw in overspray in other ways without departing from the scope of the invention.

A method of using the coating apparatus 40 that highlights the implementation of the diverter 106 will now be briefly described. The crane 22 mounts the apparatus 40 on the pipeline 10 so that the sprayer 55 is oriented toward the perimeter surface 14 of the pipeline. The controller 70 automatically directs the pneumatic cylinder 558 to move the diverter 106 to the fluid diverting position (FIG. 8). The controller 124 then operates the sprayer 55 in the fan buildup mode to build up a fan-shaped spray pattern. In the fan buildup mode, the diverter 106 diverts the flushing fluid away from the perimeter surface 14 of the pipeline 10 and the vacuum system 104 draws the diverted fluid away from the coating apparatus. After completion of the preparation mode, the controller 70 directs the pneumatic cylinder 558 to move the diverter 106 from the fluid diverting position to the non-diverting position (FIG. 9). With the diverter 106 in the non-diverting position, the controller 70 switches the coating system 20 to the spraying mode and sprays the curable liquid over the perimeter joint surface 14 as the coating apparatus 40 rotates. During the spraying mode, the vacuum system 104 draws a vacuum through the diverter 106, to remove overspray during spraying. After the spraying mode is complete, the controller 70 returns the diverter 106 to the diverting position and operates the sprayer 55 in the purge mode to flush curable liquid out of the sprayer. During the purge mode, the vacuum separator 104 draws the sprayed solvent through the diverter 106 and away from the perimeter joint surface 14.

As can be seen, the illustrated coating apparatus 40 sprays an exposed surface of a pipeline 10 in a controlled manner. The apparatus 40 functions in multiple fluid delivery modes to ensure uniform spraying of curable liquid when the exposed pipeline surface 14 is being coated. The movable diverter 106 allows flushing fluids to be diverted away from the surface 14 of the pipeline 10 without moving of the sprayer 55. Moreover, the diverter 55 functions in two capacities to dispose of flushing fluids and gaseous fumes associated with the curable coating material.

Figure 10:
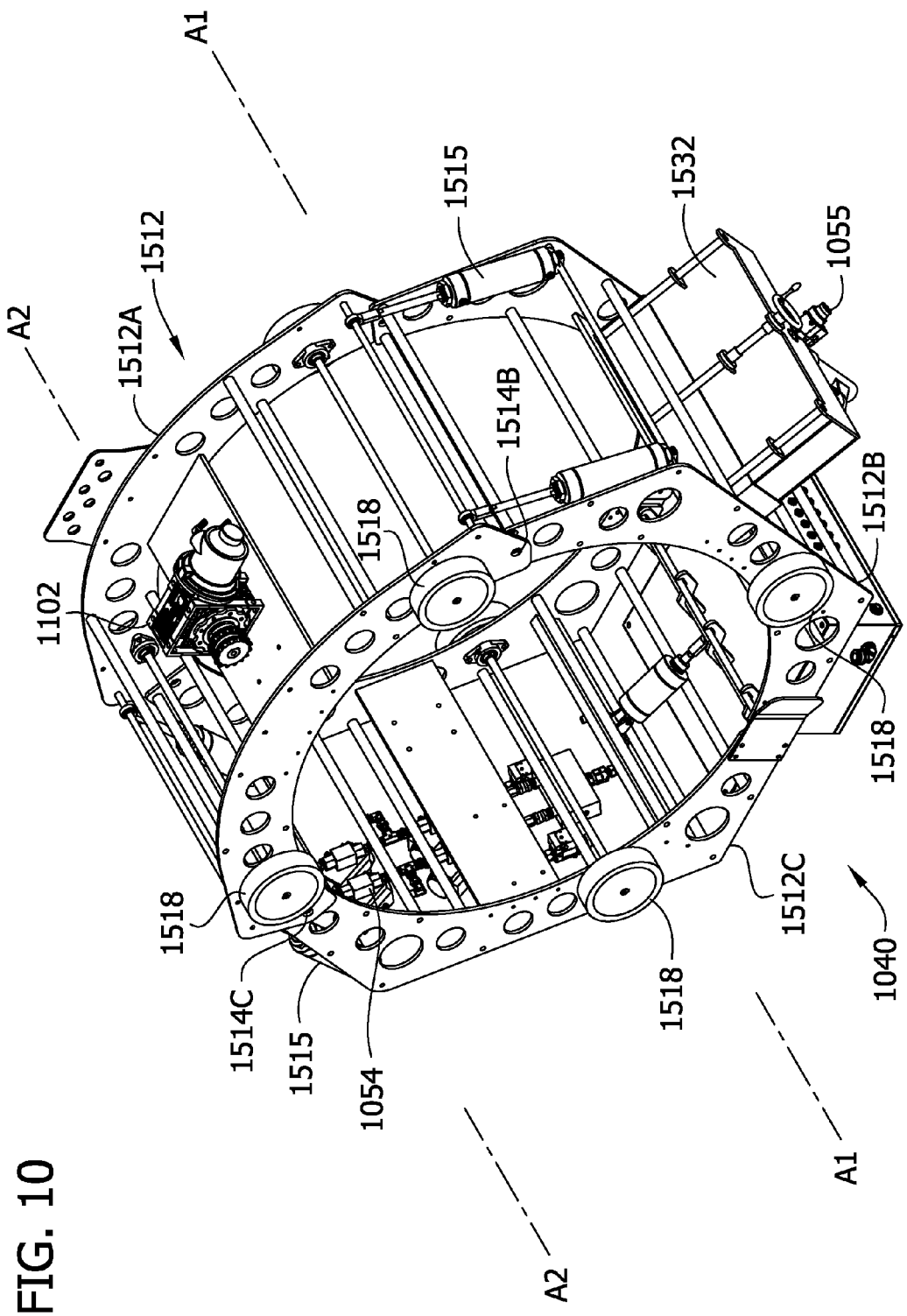
FIG. 10 is a perspective of another embodiment of a coating apparatus.

Referring to FIG. 10 another embodiment of a coating apparatus suitable for use in the coating system 20 is generally indicated at reference number 1040. The coating apparatus 1040 is similar in many respects to the coating apparatus 40. Features of the coating apparatus 1040 that correspond with features of the coating apparatus 40 are given the same reference number, plus 1000.

Like the coating apparatus 40, the coating apparatus 1040 includes a mounting frame 1512 configured to selectively mount a sprayer 1055 on the pipeline 10 so that a flow path F (FIG. 15) intersects an exposed perimeter joint surface 14 of the pipeline. A mixing manifold 1054 is mounted on the frame 1512 and is configured to be fluidly connected to the process rig 30 like the mixing manifold 54. The manifold 1054 is configured to mix the first and second components together to form the curable liquid and to provide the curable liquid to the sprayer 1055. A drive motor 1102 is mounted on the mounting frame 1512 and operatively connected to the air compressor 42. The drive motor 1102 drives rotation of wheels 1518, which are all driven wheels in certain embodiments. The wheels 1518 contact the pipeline 10 to rotate the coating apparatus 1040 around the pipeline as the sprayer 1055 sprays the curable liquid over the exposed perimeter joint surface 14.

Unlike the mounting frame 512, the mounting frame 1512 includes a central bracket 1512A and first and second end brackets 1512B, 1512C pivotally secured to the central bracket. Each of the brackets 1512A, 1512B, 1512C comprises parallel plate members. Bracing rods extend between the parallel plate members and fix the parallel plate members in spaced apart relationship. The central bracket 1512A has a first end portion near the first end bracket 1512B, a second end portion near the second end bracket 1512C, and a width extending between the first and second end portions. The first end bracket 1512B has a pivoting end portion pivotally connected to the first end portion of the central bracket 1512A at a pivoting connection 1514B. The first end bracket 1512B also has a width that extends from the pivoting end portion to an opposite interlocking end portion. The second end bracket 1512C has pivoting end portion pivotally connected to the second end portion of the central bracket 1512A at a pivoting connection 1514C. The second end bracket 1512C also has a width that extends from the pivoting end portion to an opposite interlocking end portion adjacent the interlocking end portion of the first end bracket 1512B.

Figure 11:
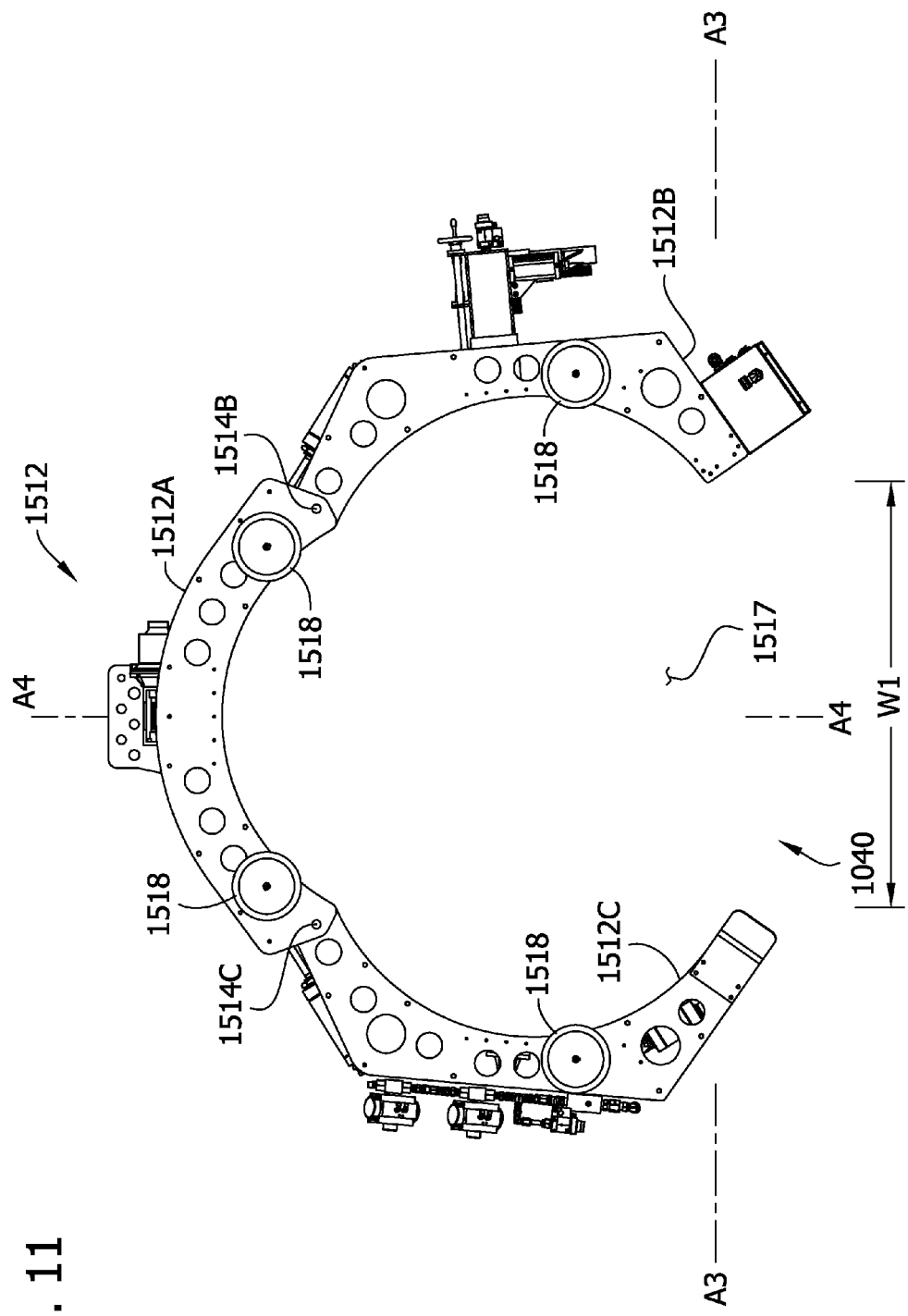
FIG. 11 is a front elevation of the coating apparatus of FIG. 10 in the open position.
Figure 12:
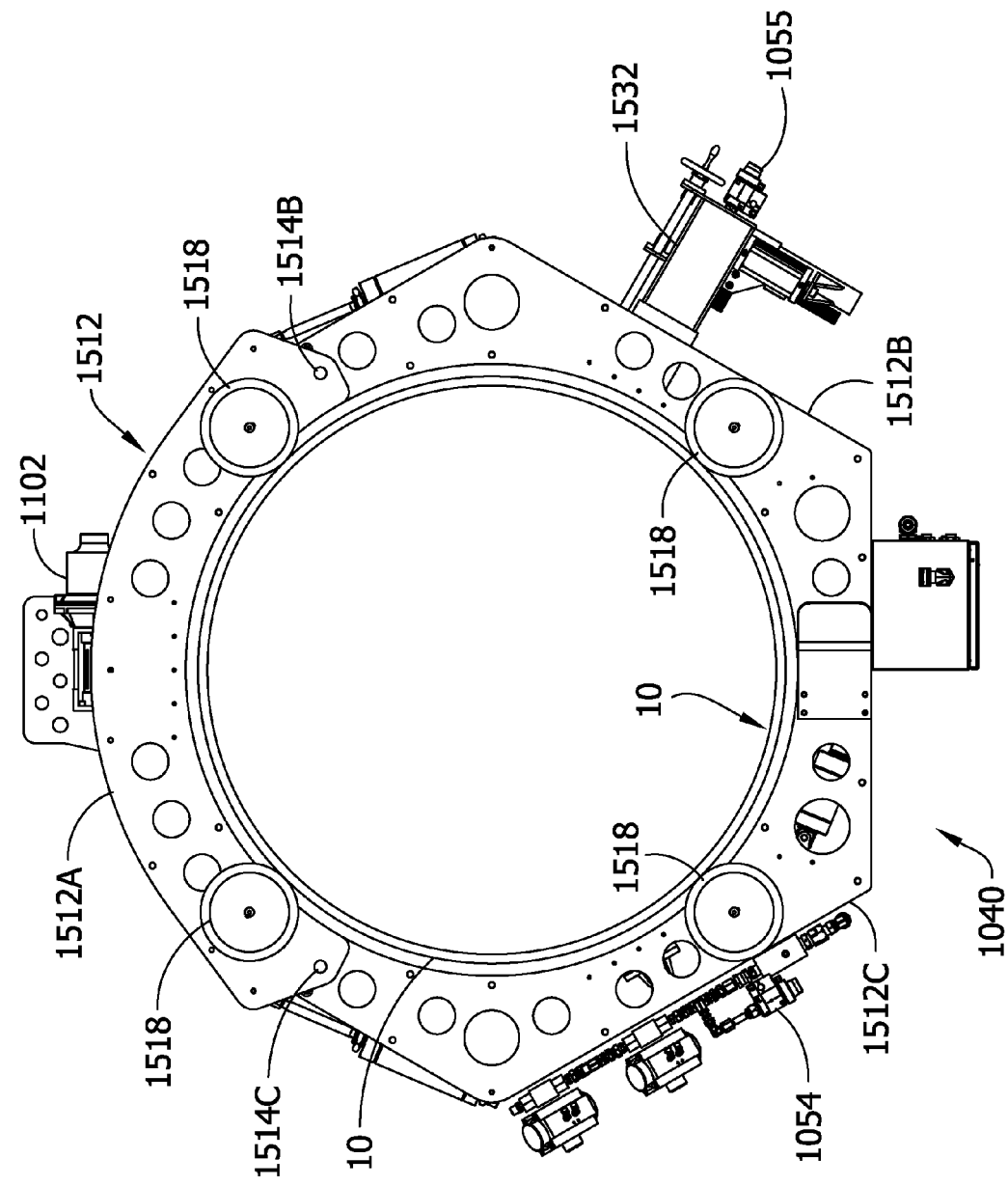
FIG. 12 is a front elevation of the coating apparatus of FIG. 10 in the closed position.

The first and second end brackets 1512B, 1512C are connected to the central bracket 1512A to pivot about first and second pivot axes A1, A2, respectively. As shown in FIGS. 11 and 12, the first and second end brackets 1512B, 1512C are selectively pivotable about the first and second pivot axes A1, A2 relative the central bracket 1512A between an open position (FIG. 11) and a closed position (FIG. 12). As will be discussed in further detail below, when the first and second end brackets 1512B, 1512C are in the closed position, the interlocking end portions are configured for selective interlocking engagement to secure the mounting frame 1512 on the pipeline 10.

As shown in FIG. 10, the coating apparatus 1040 is configured to pivot between the open and closed positions under pneumatic power. Two pneumatic cylinders 1515 are operatively connected to the mounting frame 1512 between the central bracket 1512A and the first end bracket 1512B to pivot the first end bracket between the open and closed positions. Two other pneumatic cylinders 1515 are operatively connected to the mounting frame 1512 between the central bracket 1512A and the second end bracket 1512C to pivot the second end bracket between the open and closed positions. The controller 70 is preferably operable connected to the pneumatic cylinders 1515 to drive the cylinders to open and close the mounting frame 1512 in response to operator commands.

Referring to FIG. 11, in the open position, the mounting frame 1512 defines an open gap 1517. The open gap 1517 has a width W1 extending along a gap axis A3 that is wider than the pipeline 10. Thus, in the open position, the coating apparatus 1040 may be installed on or removed from the pipeline 10, whereby the pipeline passes through the gap 1517 without contacting the frame. More specifically, the pipeline 10 can pass through the gap 1517 without contacting the frame 1512 by moving the coating apparatus 1040 along a gap movement axis A4 perpendicular to the gap axis A3. By using three brackets 1512A, 1512B, and 1512C and two pivoting connections 1514B, 1514C, the mounting frame 1512 can be pneumatically opened to have a wide pipeline receiving gap 1517. As a result, when removing the coating apparatus 1040 from the pipeline 10 after the perimeter joint surface 14 is coated with the curable liquid, it is less likely that the mounting frame 1512 will contact the pipeline and damage the coating material.

Referring to FIG. 12, in the closed position, the mounting frame 1512 is shaped and arranged for extending circumferentially around the pipeline 10 to mount the coating apparatus 1040 on the pipeline. In the illustrated embodiment, the mounting frame 1512 extends around the entire circumference of the pipeline. The interlocking end portions of the first and second end brackets 1512B, 1512C are positioned adjacent one another opposite the central bracket 1512A. Though the illustrated embodiment is shaped and arranged to extend substantially around the entire circumference of the pipeline in the closed position, it will be understood that other mounting brackets can extend around less than the entire circumference of a pipeline without departing from the scope of the invention. As shown in FIG. 12, the mounting frame 1512 is preferably shaped and arranged to automatically position the drive wheels 1518 in contact with the pipeline 10 when the mounting frame 1512 is closed around the pipeline. This ensures the drive motor 1102 can drive rotation of the coating apparatus 1040 around the pipeline during spraying.

Figure 13:
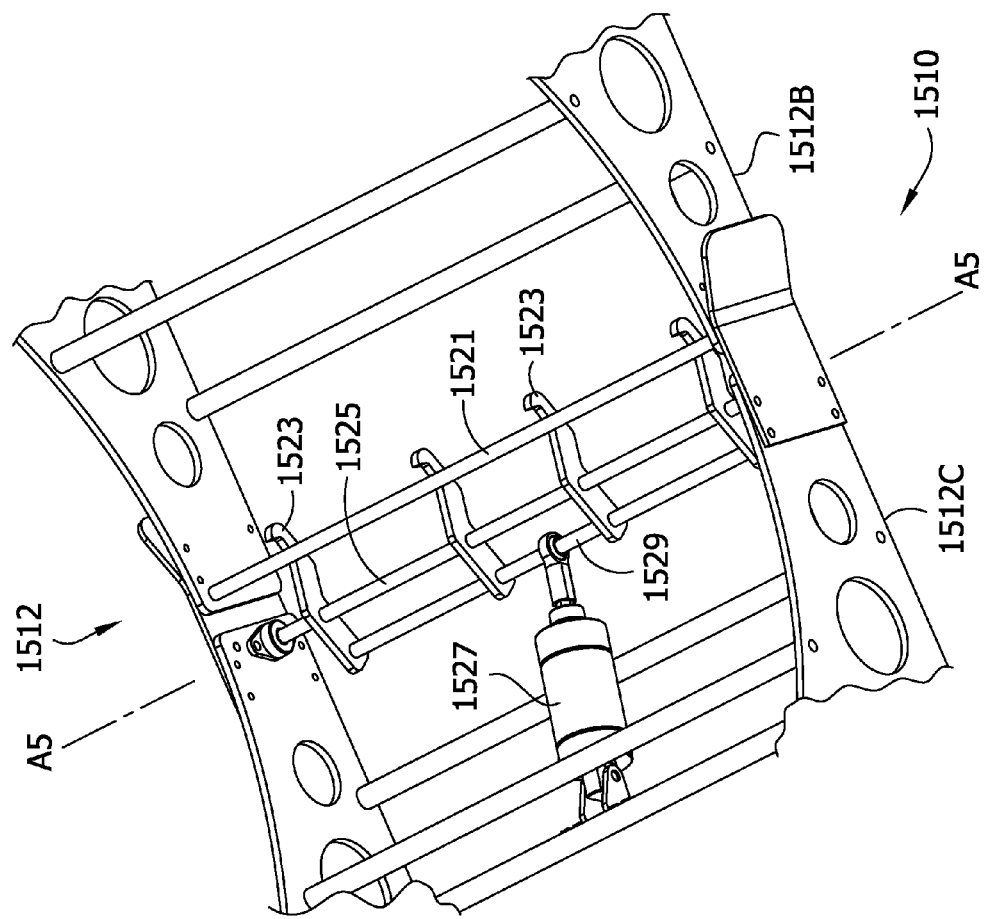
FIG. 13 is an enlarged fragmentary perspective of a locking mechanism of the coating apparatus of FIG. 10 in the unlocked position.
Figure 14:
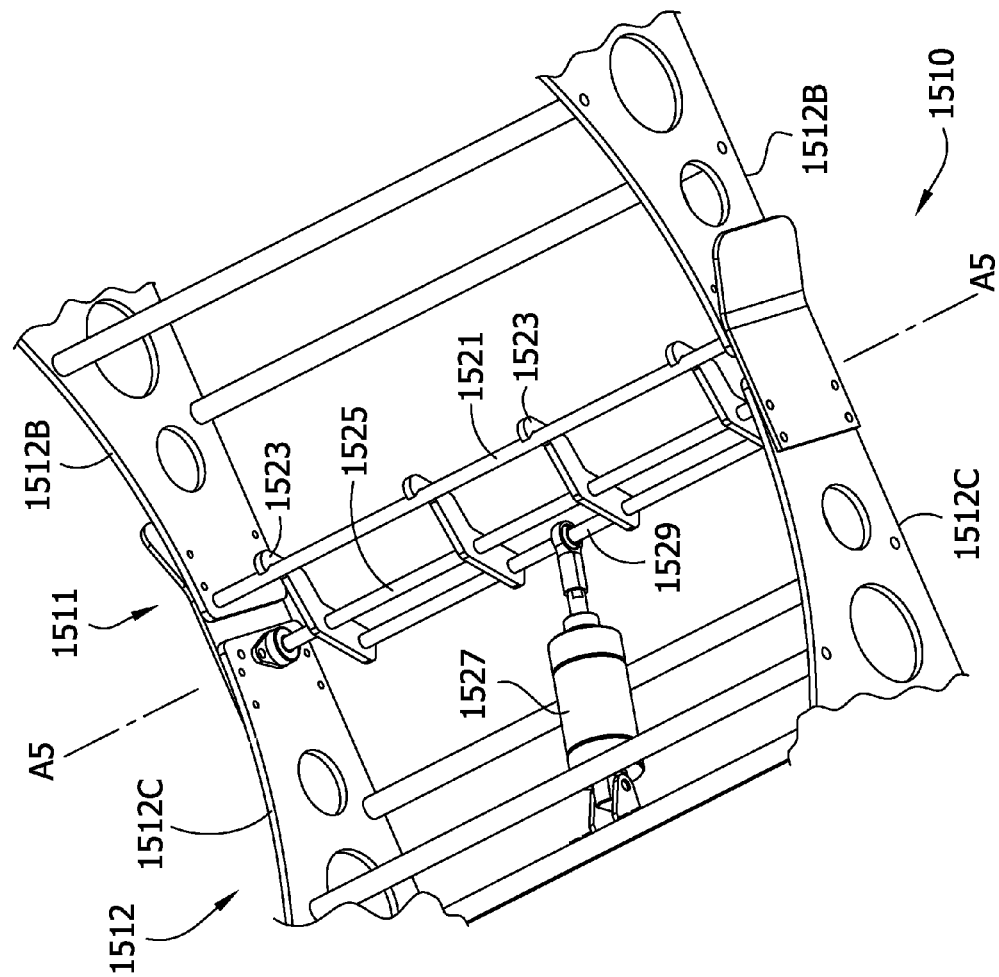
FIG. 14 is an enlarged fragmentary perspective of the locking mechanism in the locked position.

Referring to FIGS. 13 and 14, the illustrated coating apparatus 1040 includes a locking mechanism 1511 configured to selectively lock the mounting frame 1512 is in the closed position. The locking mechanism 1511 includes a retaining shaft 1521 (broadly, a retaining member) that is fixed to the interlocking end portion of the first end bracket 1512B. In the illustrated embodiment, the retaining shaft 1521 extends between the plate members forming the first end bracket 1512B. In other embodiments retaining members can have other configurations without departing from the scope of the invention. The locking mechanism 1511 also includes plurality locking hooks 1523 (each, broadly a locking member). The locking hooks 1523 are configured to lockingly engage the retaining shaft to secure the mounting frame 1512 in the closed position on the pipeline 10. The locking hooks 1523 are pivotally connected to the interlocking end portion of the second end bracket 1512C. In the illustrated embodiment the locking hooks 1523 are spaced apart along a pivoting shaft 1525 extending between the two plate members forming the second end bracket 1512B. The pivoting shaft 1525 is pivotally mounted on the mounting frame 1512 to pivot about a pivot axis A5. The pivoting shaft 1525 and the retaining shaft 1521 extend along parallel axes in the illustrated embodiment.

The locking hooks 1523 are selectively pivotable around the pivot axis A5 from an unlocked position (FIG. 13) in which the locking hooks are spaced apart from the retaining shaft 1521 to a locked position (FIG. 14) in which the locking hooks lockingly engage the retaining shaft. Each of the locking hooks 1523 has hook end and an opposite free end. Each hook end is sized and arranged for interlockingly engaging the retaining shaft 1521. In the illustrated embodiment, the locking hooks 1523 are fixedly mounted on the pivoting shaft 1525, and the pivoting shaft is configured to pivot around the pivot axis A5, which is collocated with the central longitudinal axis of the pivoting shaft. Alternatively, the locking hooks could be pivotally mounted on the pivot shaft to pivot around a pivot axis without departing from the scope of the invention. The pivot shaft could also be pivotally mounted on one or more pivot arms that pivot about a pivot axis spaced apart from the central longitudinal axis thereof without departing from the scope of the invention.

A pneumatic cylinder 1527 is operatively connected to an attachment shaft 1529 that is attached to the free ends of the locking hooks 1523. When the pneumatic cylinder 1527 is actuated, it drives the attachment shaft 1529 and locking hooks 1523 in rotation about the pivot axis A5 to pivot the hooks between the locked and unlocked positions. Preferably, the controller 70 is operatively connected to the pneumatic cylinder 1527 to selectively actuate the cylinder to move the locking hooks 1523 about the pivot axis A5 between the locked and unlocked positions.

Figure 15:
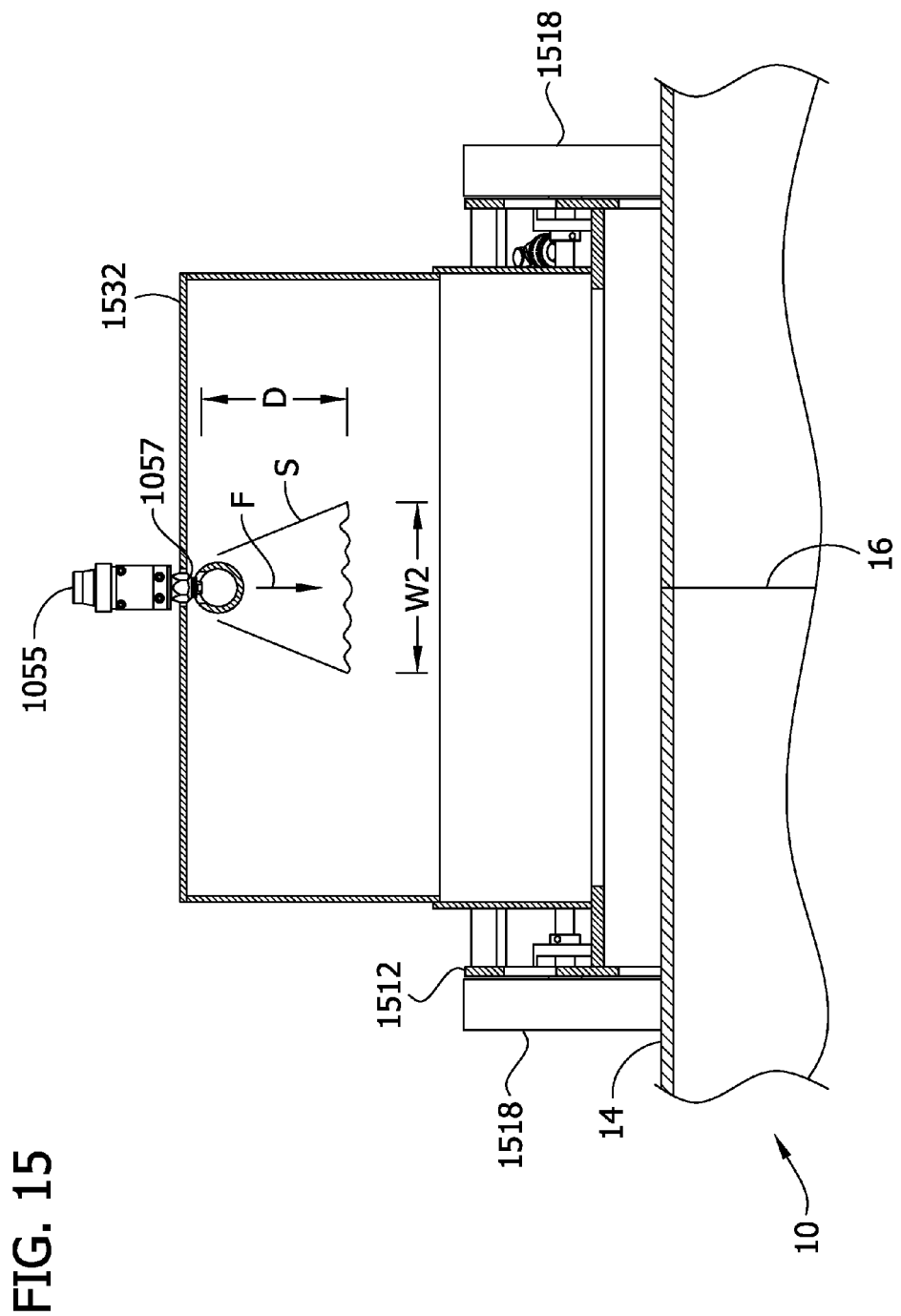
FIG. 15 is an enlarged cross section of a sprayer assembly of the coating apparatus of FIG. 10 and the pipeline.

As shown in FIG. 15, the sprayer 1055 is configured to spray the curable liquid toward the perimeter joint surface 14 along a flow path F that widens as the curable liquid travels away from the sprayer. The sprayer 1055 has a spray nozzle 1057. The sprayer 1055 delivers the curable liquid along the flow path F so the fluid flow is oriented away from the spray nozzle 1057. The flow path F has a spray pattern that flares outwardly in a fan pattern such that the flow path has a width W2. The width W2 of the flow path F increases as a distance D of the flow path from the spray nozzle 1057 increases. As a result of the fan pattern of the flow path F, the sprayer 1055 is capable of coating different widths of the pipeline 10 with the curable liquid depending on the distance between the spray nozzle 1057 and perimeter surface 14. In the illustrated embodiment, the coating apparatus 1040 is configured to adjust the distance D between the spray nozzle 1057 and the perimeter surface 14 to adjust the width W2 of the pipeline 10 the coating apparatus sprays with the curable liquid.

Figure 16:
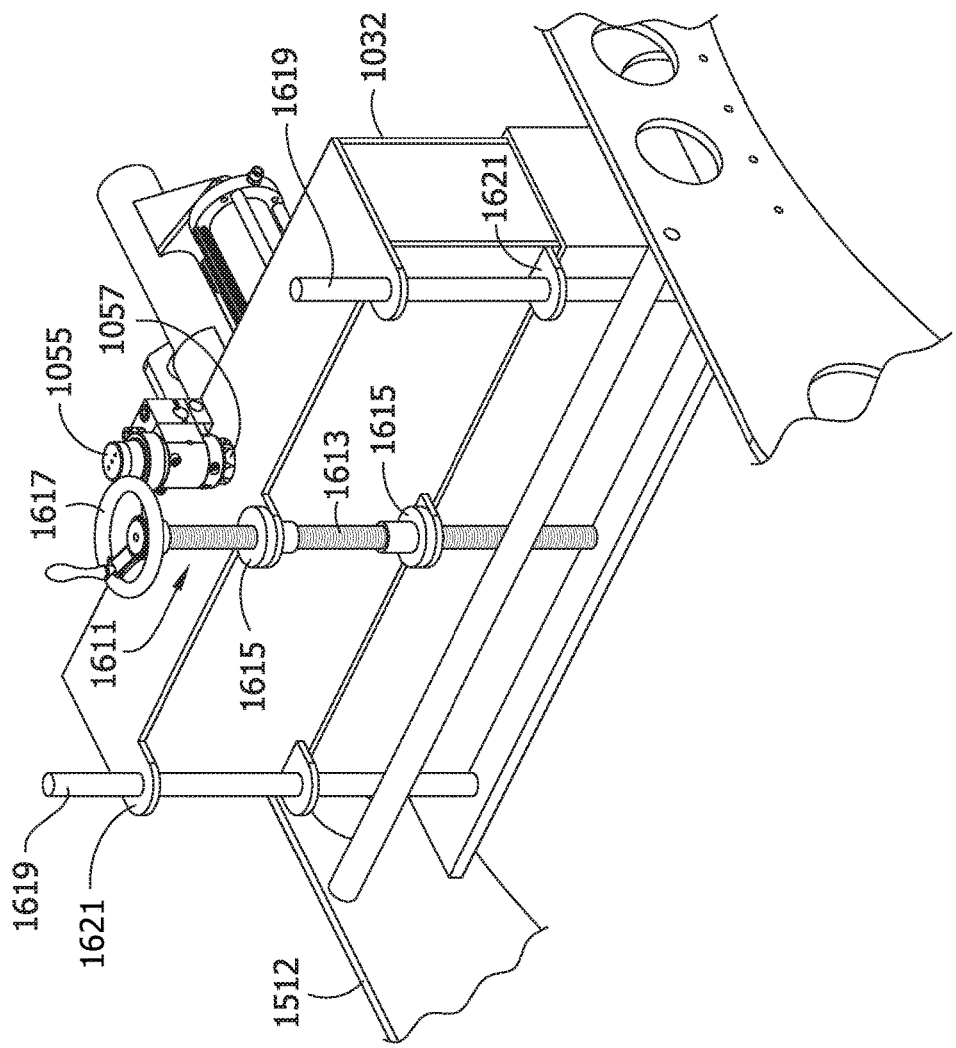
FIG. 16 is an enlarged perspective of the sprayer assembly.
Figure 17:
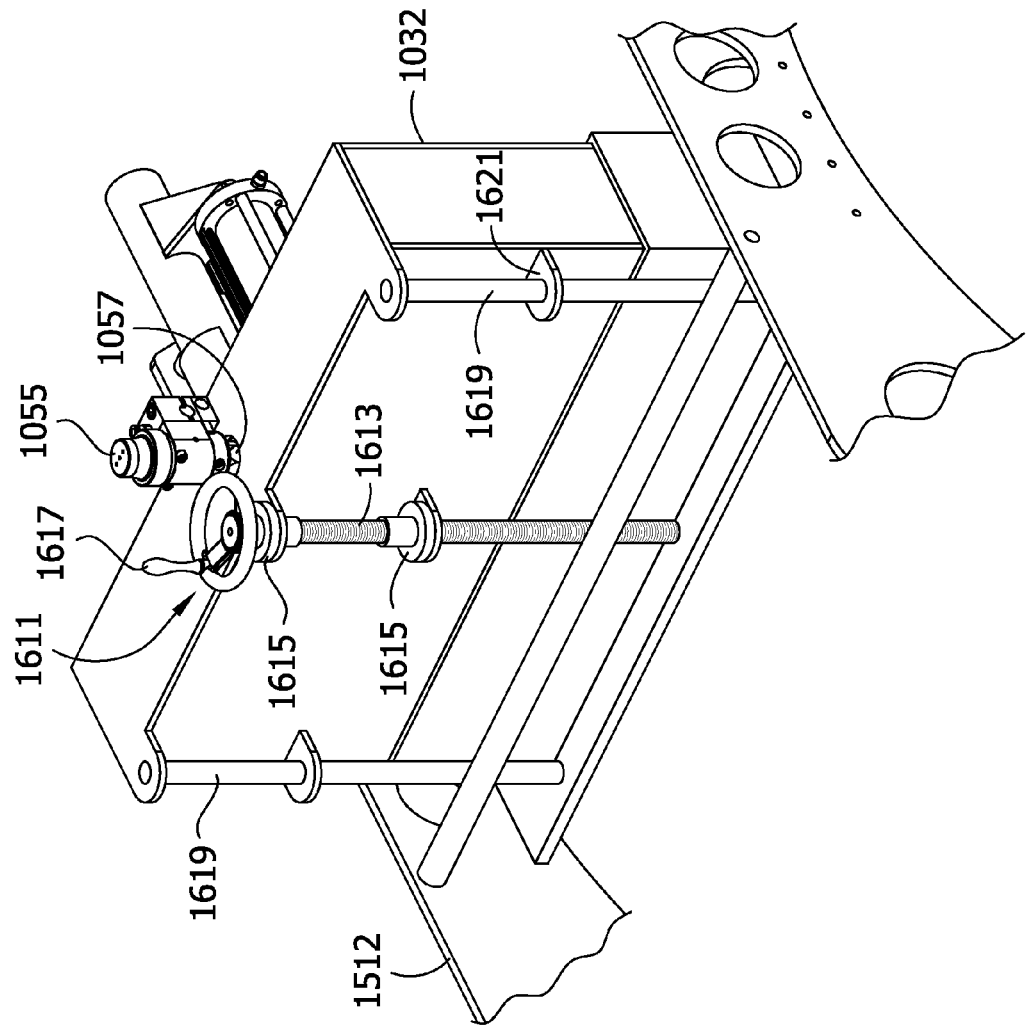
FIG. 17 is another enlarged perspective of the sprayer assembly illustrating the sprayer in a different position than FIG. 16 relative to a mounting frame of the coating apparatus.

Referring to FIGS. 16 and 17, the illustrated coating apparatus includes an adjustable sprayer mount 1611. The sprayer mount 1611 mounts the sprayer 1055 and shroud 1532 on the mounting frame 1512 for movement relative to the mounting frame. The sprayer mount 1611 orients the sprayer 1055 so that the flow path F is oriented toward the perimeter surface 14 of the pipeline 10 when the mounting frame is mounted on the pipeline (FIG. 15). Moreover, as shown by comparison of FIGS. 16 and 17, the sprayer mount 1611 is configured to selectively move the sprayer 1055 relative to the mounting frame 1512 to adjust the distance D between the spray nozzle 1057 and the exterior surface of the pipeline to thereby adjust the width Ws of the flow path F at the location where the flow path intersects the exterior surface 14 of the pipeline.

In the illustrated embodiment, the sprayer mount comprises a threaded shaft 1613 and a pair of threaded guide collars 1615 threadably mated to the threaded shaft. The threaded shaft 1613 is mounted on the mounting frame 1512 for rotation relative to the mounting frame, but is prevented from moving in translation relative to the mounting frame along its longitudinal axis. The guide collars 1615 are threaded onto the shaft 1613 and fixedly mounted on the overspray shroud 1532. The sprayer 1055 is also fixedly mounted on the overspray shroud 1532. An adjustment knob 1617 is fixed to the free end of the shaft 1613 to allow a user to rotate the threaded shaft. The threaded shaft 1613 rotates in the guide collars 1615, which causes the guide collars to translate relative the shaft along its longitudinal axis. The shroud 1532 and sprayer 1055 move conjointly with the guide collars 1615 and relative to the perimeter joint surface 14 of the pipeline 10.

Thus, a user can adjust the distance D between the spray nozzle 1057 and the perimeter joint surface 14 and thereby adjust the width Ws of the spray pattern S at the joint surface by rotating the knob 1617. Although the illustrated embodiment uses a threaded shaft mounted on the mounting frame and threaded collars mounted on the sprayer assembly to form the movable sprayer mount, it will be understood that other embodiments can use other movable sprayer mounts to adjust the width of the sprayed-on coating without departing from the scope of the invention. Moreover, it is also contemplated that the distance adjustment could be automated without departing from the scope of the invention.

In the illustrated embodiment, the sprayer 1055 and shroud 1532 are supported as they move relative to the mounting frame 1512. The coating apparatus 1040 includes non-threaded support shafts 1619 oriented parallel to the threaded shaft 1613. The support shafts 1519 are mounted on the base frame 1512. Each of the support shafts 1619 is slidably received in a pair of non-threaded support collars 1621 that is fixed to the shroud 1532. As the guide collars 1615 translate relative to the threaded shaft 1613, the support collars 1621 slide along the support shafts 1619 to support the shroud 1532 as it moves.

Figure 18:
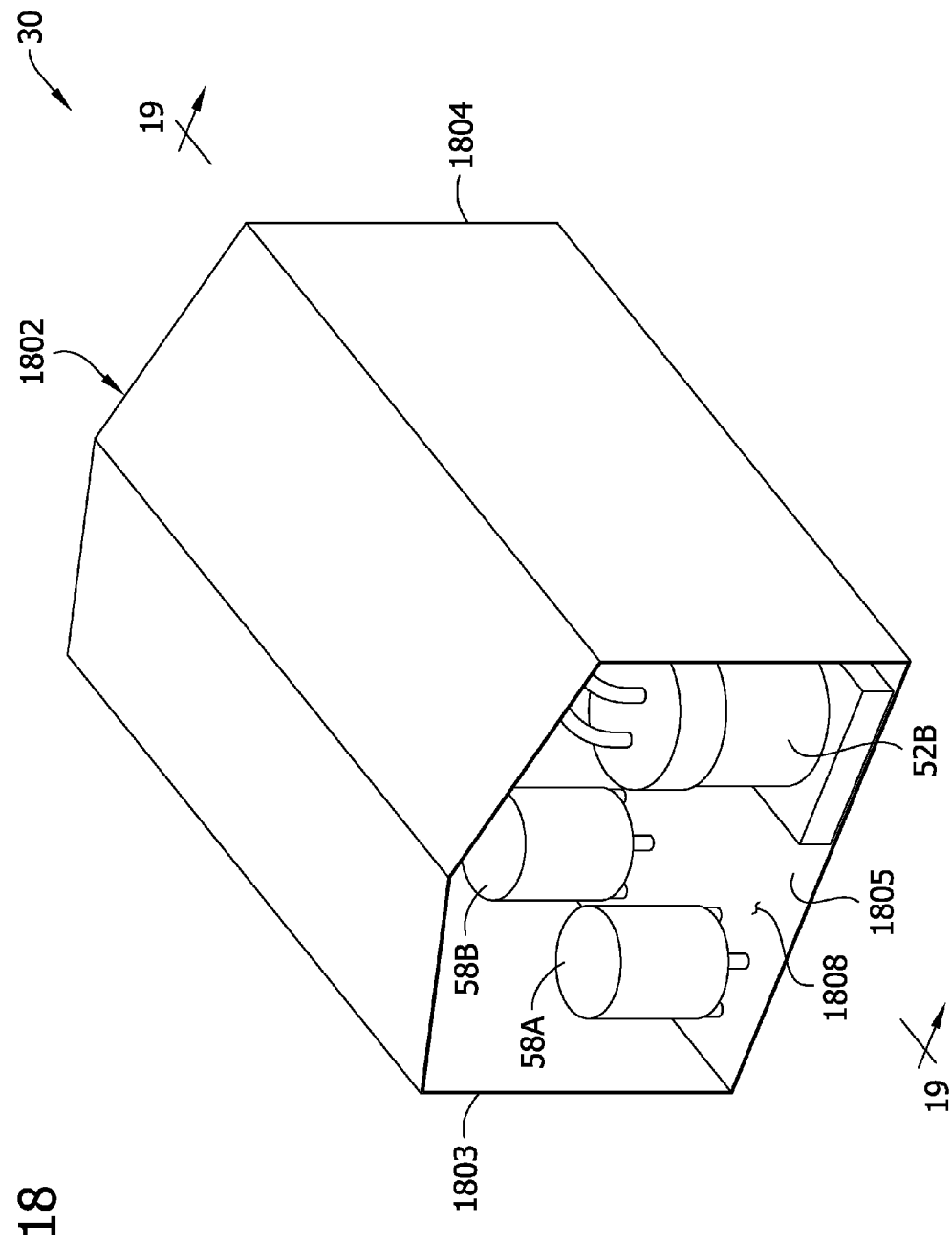
FIG. 18 is a perspective of a process rig of the coating system.

Referring to FIG. 18, aspects of an exemplary embodiment of the process rig 30 will now be described. The process rig 30 includes a housing 1802 that has a front end 1803, a rear end 1804, and a floor 1805. The housing 1802 defines a process rig interior 1808. The process rig interior 1806 receives various components of the fluid system 50, such as the day tanks 52A, 52B, pumps 76A, 76B (not shown in FIG. 18), and associated plumbing.

Figure 19:
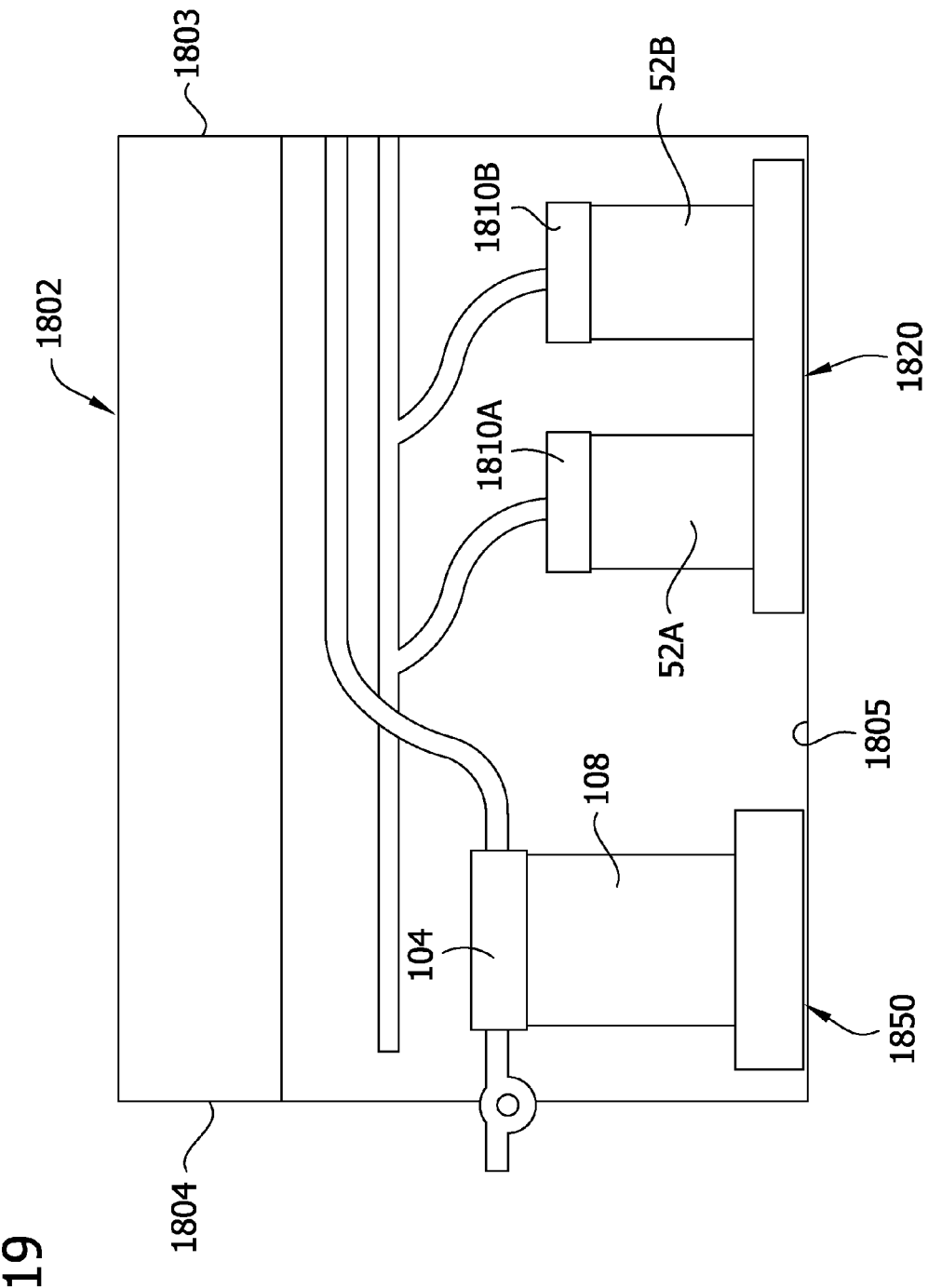
FIG. 19 is a cross section of the process rig taken in the plane of line 19-19 of FIG. 18.
Figure 20:
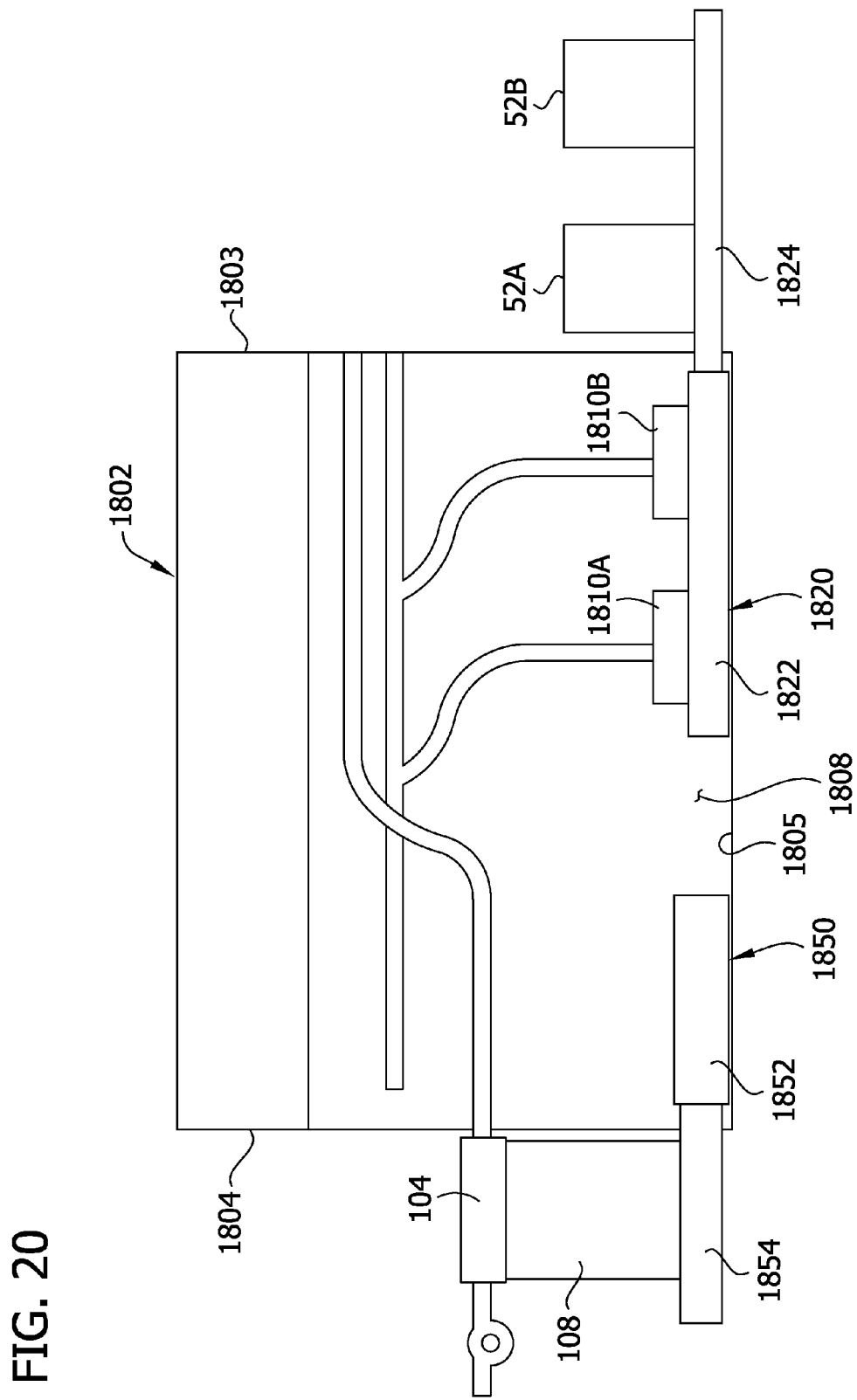
FIG. 20 is similar to FIG. 19 but illustrates a drum support and a vessel support of the process rig in loading positions.

Referring to FIG. 19, the process rig housing 1802 is also configured to receive the replaceable fluid component drums 52A, 52B. Conventionally, the components of a curable liquid are manufactured and stored in large drums (e.g., 55-gallon drums) that are difficult to transport and store. The term "drum" will refer to any suitable movable container for storing one or more components of a curable liquid. Rather than pouring the first and second fluid components from the drums 52A, 52B into the day tanks 58A, 58B, the illustrated process rig 30 includes drum fittings 1810A, 1810B that can be fitted over the open top ends of new drums as they are replaced. The fittings 1810A, 1810B fluidly connect the drums 52A, 52B to the fluid system 50 so that the pumps 56A, 56B can pump the first and second fluids into the day tanks 58A, 58B. Once the pumps 56A, 56B pump out all of the fluid contained in one of the drums 52A, 52B, the empty drum can be removed and a new drum can be installed. As explained below and illustrated by comparison of FIGS. 19 and 20, the process rig 30 includes a movable drum support 1820, which simplifies the process of replacing the drums 52A, 52B.

Figure 21:
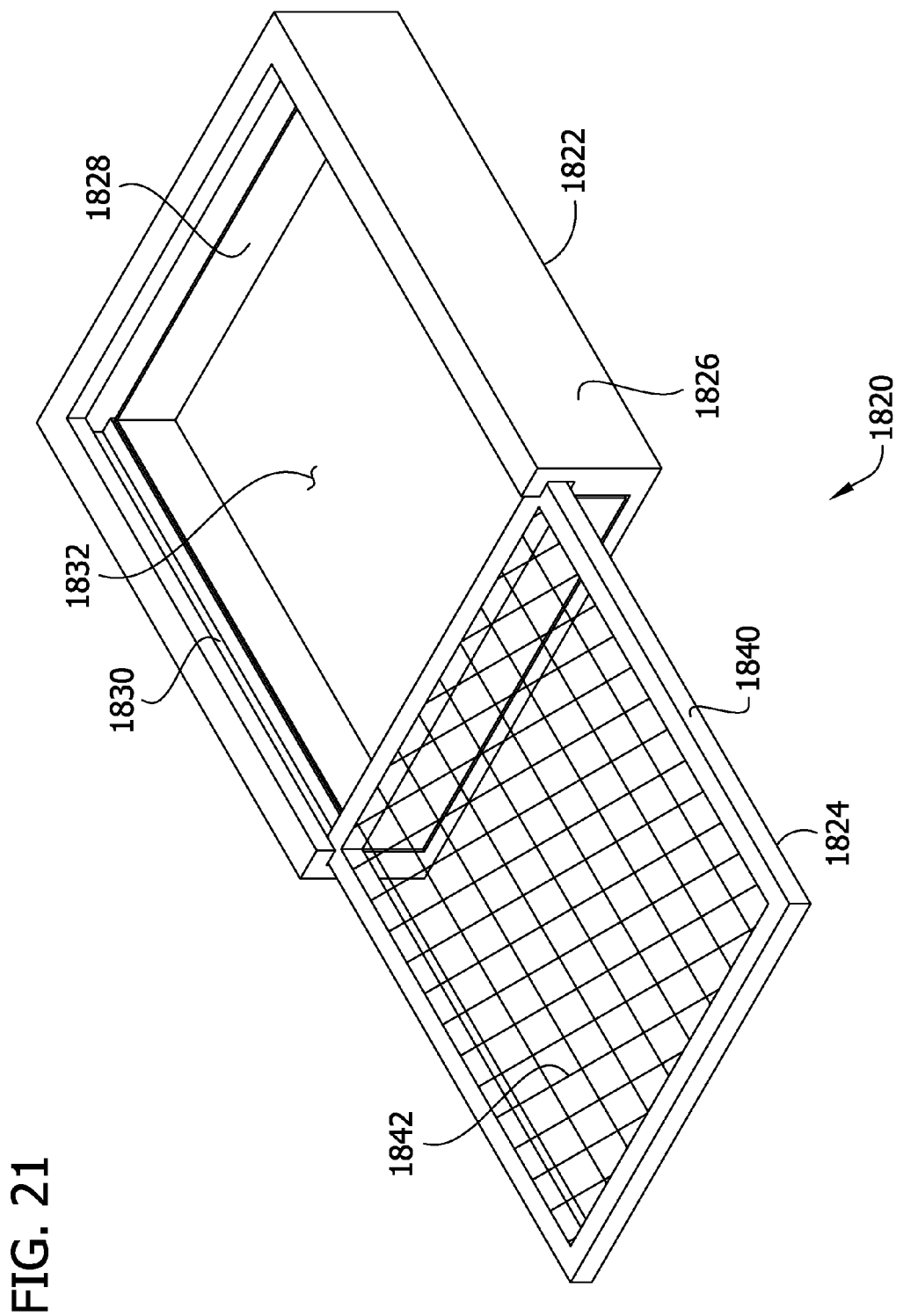
FIG. 21 is a perspective of the drum support in the loading position.

As shown in FIG. 21, the illustrated drum support 1820 comprises a base 1822 and a movable platform 1824. The base 1820 is fixedly mounted on the floor 1805 of the process rig housing 1802 near the front end 1803. The base 1820 includes an outer base frame 1826 and an inner tray 1828. The base frame 1826 supports guide rails 1830 that guide movement of the platform 1824 relative to the base 1822. The tray 1828 defines a secondary liquid containment cavity 1832 for receiving any liquid that is spilled from either of the drums 52A, 52B in use (FIG. 19).

The platform 1824 is configured to support the drums 52A, 52B. The platform 1824 includes an outer frame 1840, which is slidably mounted on the base 1822. The platform 1824 rotatably mounts guide rollers (not shown) that are received in the guide rails 1830. As the platform 1824 slides relative to the base 1822, the guide rollers roll along the guide rails 1830 to guide the movement of the platform. Preferably, the platform 1824 is liquid-permeable. In the illustrated embodiment, the platform comprises a metal grate 1842 that is supported by the frame 1840. The platform 1824 permits any liquid that leaks or spills from the drums 52A, 52B to pass through the metal grate.

The platform 1824 is slidably mounted on the base to slide relative to the base between a drum loading position (FIG. 20) and an operational position (FIG. 19). In the drum loading position, the platform 1824 extends out of the front end 1803 of the process rig housing 1802. In some embodiments, the interior 1805 of the process rig 30 is small. Because of the small size, it can be difficult to load the oftentimes bulky drums 52A, 52B into the process rig 30. By extending the platform 1824 outside the process rig in the drum loading position, the drums 52A, 52B can be more easily removed from and loaded onto the drum support 1820. Once new drums are positioned on the platform 1824, the platform can slide relative to the base 1822 to the operational position. In the operational position, the drums 52A, 52B are positioned in the interior 1805 of the rig housing 1802. Moreover, the platform 1824 is positioned over the base 1822. As a result, any liquid that spills or leaks from the drums 52A, 52B falls through the grate 1842 and into the secondary liquid containment cavity 1832. The tray 1830, therefore, provides secondary containment of the components of the curable liquid in the event of a leak or spill.

Referring again to FIGS. 19 and 20, the process rig 30 also includes a movable reclamation vessel support 1850 for supporting the reclamation vessel 108. In certain embodiments, the reclamation vessel 108 can be removed and replaced after it is filled. Thus, like the drums 52A, 52B, it is desirable to provide for easy loading and unloading of the reclamation vessel. The illustrated reclamation vessel support 1850 is substantially the same as the drum support 1820. The vessel support 1850 includes a base 1852 that is mounted on the floor 1805 of the housing 1802 near the rear end 1804. The base 1852 includes a tray that defines a secondary containment cavity. A movable, liquid-permeable platform 1854 is slidably mounted on the base to slide between a vessel loading position (FIG. 20) and an operational position (FIG. 19). In the vessel loading position, the platform 1854 extends out of the rear end 1804 of the housing 1802 so that the reclamation vessel 108 can be replaced outside of the housing. In the operational position, the platform 1854 is positioned within the interior 1805 of the housing 1802 over the base 1852. Any liquid that spills or leaks from the secondary containment vessel falls through the liquid permeable platform 1854 and into the secondary containment cavity defined by the base 1852.

Other Statements of the Invention

The following are statements of the invention described in the present application. Although not currently presented as claims, they constitute applicant's statement of invention(s) believed to be patentable and may subsequently be presented as claims.

A. A system for coating a perimeter surface of a pipeline comprising:
  a coating apparatus comprising:
  a sprayer configured to spray curable liquid along a flow path; and
  a frame supporting the sprayer and configured to selectively mount the sprayer on the pipeline to orient the sprayer so the flow path is oriented toward the perimeter surface of the pipeline and to move the sprayer relative to the pipeline to coat the perimeter surface of the pipeline with the curable liquid;
  a rig located remote from the pipeline comprising one or more containers, each of the one or more containers containing at least one component of the curable liquid;
  plumbing fluidly connecting the containers to the sprayer;
  a pump fluidly connected to the plumbing to pump the at least one component of the curable liquid from the one or more containers through the plumbing to form the curable liquid and to pump the curable liquid through the sprayer whereby the sprayer sprays the curable liquid along the flow path;
  a heater operatively connected to the plumbing to heat at least one component of the curable liquid;
  a temperature transmitter operatively connected to the plumbing to sense a temperature of the at least one component of the curable liquid and to produce a temperature signal representative of the sensed temperature, the temperature transmitter being located at the coating apparatus; and
  a controller operatively connected to the temperature transmitter and the heater to receive the temperature signal from the temperature transmitter and to adjust the heater based on the received temperature signal to adjust the temperature of the at least at least one component of the curable liquid.

B. A system as set forth in claim A wherein the temperature transmitter comprises a first temperature transmitter and the temperature signal produced by the first temperature transmitter comprises a first temperature signal, the system further comprising a second temperature transmitter operatively connected to the plumbing to sense the temperature of the at least one component of the curable liquid to produce a second temperature signal representative of the temperature sensed by the second temperature transmitter, the second temperature transmitter being located remote from the sprayer frame.

C. A system as set forth in claim B wherein the controller is operatively connected to the second temperature transmitter to receive the second temperature signal and is configured to adjust the heater based on the first temperature signal and the second temperature signal.

D. A system as set forth in claim C wherein the rig comprises first and second containers storing first and second components of the curable liquid, respectively, the plumbing defining first and second fluid flow paths and comprising a mixing manifold located at the coating apparatus and fluidly connected to the sprayer, the first fluid flow path extending from the first container to the mixing manifold to convey the first component of the curable liquid to the mixing manifold and the second fluid flow path extending from the second container to the mixing manifold to convey the second component of the curable liquid to the mixing manifold, the mixing manifold being configured to mix the first and second components of the curable liquid to form the curable liquid.

E. A system as set forth in claim D wherein the pump, heater, first temperature sensor, and second temperature sensor are connected to plumbing along the first fluid flow path.

F. A system as set forth in claim E wherein the pump and heater comprise a first pump and first heater, respectively, the system further comprising a second pump, second heater, and third temperature sensor operatively connected to the plumbing along the second fluid flow path.

G. A system as set forth in claim F wherein the controller is operatively connected to the second heater and to the third temperature sensor to receive a third temperature signal from the third temperature sensor and to adjust the second heater based on the third temperature signal.

H. A system as set forth in claim A further comprising a pressure transmitter operatively connected to the plumbing to sense a pressure of the at least one component of the curable liquid and to produce a pressure signal representative of the sensed pressure.

I. A system as set forth in claim H wherein the controller is configured to receive the pressure signal and to adjust the pump based on the pressure signal to adjust the pressure of the at least one component of the curable liquid toward a pressure for spraying the curable liquid.

J. A system as set forth in claim H wherein the pressure transmitter is located at the coating apparatus.

K. A system as set forth in claim J wherein the pressure transmitter comprises a first pressure transmitter and the pressure signal produced by the first pressure transmitter comprises a first pressure signal, the system further comprising a second pressure transmitter operatively connected to the plumbing to sense the pressure of the at least one component of the curable liquid to produce a second pressure signal representative of the pressure sensed by the second pressure transmitter, the second pressure transmitter being located remote from the sprayer frame, the controller being operatively connected to the second pressure transmitter to receive the pressure signal and is configured to adjust the pump based on the first pressure signal and the second pressure signal.

L. A system as set forth in claim A wherein the plumbing includes one or more recirculation valves configured to selectively fluidly disconnect the one or more containers from the sprayer and wherein the plumbing is configured to recirculate the at least one component of the curable liquid when the one or more recirculation valves fluidly disconnects the one or more containers from the sprayer.

M. A system as set forth in claim L wherein the one or more recirculation valves are operatively connected to the controller and the controller is configured to selectively actuate the one or more recirculation valves based on the temperature signal.

N. A system as set forth in claim L wherein the one or more recirculation valves are located at the coating apparatus.

O. A method of controlling the delivery of curable liquid to a sprayer of a coating apparatus, the coating apparatus being configured to selectively mount the sprayer on a pipeline to spray the curable liquid along a flow path oriented toward a perimeter surface of the pipeline and to move the sprayer relative to the pipeline to coat the perimeter surface with the curable liquid, the method comprising:

pumping at least one component of the curable liquid from a container located remote from the pipeline through plumbing fluidly connecting the container to the sprayer;

receiving a temperature signal representative of a temperature of the at least one component of the curable liquid at the coating apparatus; and adjusting a heater operatively connected to the plumbing based on the received temperature signal to adjust the temperature of the at least one component of the curable liquid toward.

P. A method as set forth in claim O wherein the step of receiving the temperature signal comprises receiving a first temperature signal, the method further comprising receiving a second temperature signal representative of a temperature of the at least one component of the curable liquid adjacent the container, and wherein the step of adjusting the heater comprises adjusting the heater based on the first temperature signal and the second temperature signal.

Q. A method as set forth in claim O further comprising receiving a pressure signal representative of a pressure of the at least one component of the curable liquid at the coating apparatus.

R. A method as set forth in claim O further comprising adjusting a rate at which the at least one component of the curable liquid is pumped from the container based on the pressure signal.

S. A method a set forth in claim O further comprising actuating at least one recirculation valve to fluidly disconnect the at least one container from the sprayer and to recirculate the at least one component of the curable liquid through the heater.

T. A method of operating a coating apparatus, the coating apparatus comprising a sprayer configured to spray fluid along a flow path and to be selectively switchable between operational modes including a spraying mode in which the sprayer delivers curable liquid along the flow path and a purge mode in which the sprayer delivers a solvent along the flow path to purge the sprayer, the coating apparatus being configured to selectively mount the sprayer on a pipeline to move the sprayer relative to the pipeline while the sprayer is operating in the spraying mode to coat a perimeter surface of the pipeline with the curable polymer, the method comprising:

detecting a solvent level representative of an amount of solvent in a solvent container from which the sprayer receives the solvent comparing the detected solvent level to a threshold solvent level;

permitting the sprayer to operate in the spraying mode when the detected solvent level is greater than the threshold solvent level; and automatically preventing the sprayer from operating in the spraying mode when the detected solvent level is less than the threshold solvent level.

U. A method of evaluating a polymeric coating formed on each of a plurality of perimeter joint surfaces of a pipeline, the method comprising:

storing in a database spray process data about one or more spray process conditions for each of the joint surfaces, the spray process data being received from one or more process sensors of a joint coating apparatus configured to spray each of the perimeter joint surfaces with a curable liquid to form the respective polymeric coating, said one or more process sensors being configured to detect said one or more spray process conditions while the joint coating apparatus sprays each of the perimeter joint surfaces with the curable liquid, and associating in the database the spray process data for each of the perimeter joint surfaces with joint identity data which identifies the respective perimeter joint surface.

V. A method as set forth in claim U further comprising storing joint identity data in the database for each of the plurality of perimeter joint surfaces when the joint coating apparatus sprays the respective perimeter joint surface with the curable liquid.

W. A method as set forth in claim U wherein the joint identity data for each of the plurality of perimeter joint surfaces comprises at least one of global positioning system coordinates, an applicator identifier, and an application time for the respective perimeter joint surface.

X. A method as set forth in claim U wherein the process data comprises at least one of a process temperature, process pressure, and process ratio.

Y. A system for monitoring polymeric coating formed on each of a plurality of perimeter joint surfaces of a pipeline comprising:

a database configured to store spray process data about one or more spray process conditions for each of the joint surfaces, the spray process data being received from one or more process sensors of a joint coating apparatus configured to spray each of the perimeter joint surfaces with a curable liquid to form the respective polymeric coating, said one or more process sensors being configured to detect said one or more spray process conditions while the joint coating apparatus sprays each of the perimeter joint surfaces with the curable liquid; and a processor executing instructions to associating in the database the spray process data for each of the perimeter joint surfaces with joint identity data which identifies the respective perimeter joint surface.

AA. A rig for use in delivering a curable liquid to a coating apparatus for coating a perimeter surface of a pipeline, the rig comprising:

a housing defining an interior and having a floor;
one or more drums located within the housing, each of the one or more drums containing a component of the curable liquid;
a drum support comprising:
a base fixedly mounted on the floor of the housing, the base comprising a tray defining a secondary liquid containment cavity; and
a liquid-permeable platform configured to support the one or more drums, the platform being slidably mounted on the base to slide relative to the base between a drum loading position and an operational position, the platform extending outside of the interior of the housing when positioned in the drum loading position to receive the one or more drums thereupon, the platform being positioned above the tray when the platform is in the operational position such that any of the at least one components of the curable liquid contained in the one or more drums that leaks onto the platform passes through the platform and into the secondary liquid containment cavity.

AB. A rig as set forth in claim AA wherein the liquid permeable platform comprises a metal grate.

AC. A rig as set forth in claim AA further comprising a reclamation vessel configured to receive reclaimed curable liquid from a reclamation system of the coating apparatus.

AD. A rig as set forth in claim AC wherein the rig further comprises a reclamation vessel support comprising:
a base fixedly mounted on the floor of the housing, the base comprising a tray defining a secondary liquid containment cavity; and
a liquid-permeable platform configured to support the reclamation vessel, the platform of the reclamation vessel support being slidably mounted on the base of the reclamation vessel support to slide relative to the base of the reclamation vessel support between a vessel loading position and an operational position, the platform of the reclamation vessel support extending outside of the interior of the housing when positioned in the vessel loading position to receive the reclamation vessel thereupon, the platform of the reclamation vessel support being positioned above the tray of the reclamation vessel support when the platform of the reclamation vessel support is in the operational position such that any of the curable liquid that leaks onto the platform passes through the platform and into the secondary liquid containment cavity.

AE. A rig as set forth in claim AD wherein the housing has a front end and a rear end, the base of the drum support being mounted on the floor adjacent the front end of the housing and the base of the reclamation vessel support being mounted on the floor adjacent the rear end of the housing.

AF. A coating apparatus for coating a perimeter surface of a pipeline, the coating apparatus comprising:
a mounting frame configured to be selectively mounted on the pipeline;
a sprayer having a spray nozzle configured to deliver fluid along a flow path oriented away from the spray nozzle and flaring outwardly in a fan pattern such that the flow path has a width and the width of the flow path increases as a distance of the flow path from the spray nozzle increases;
an adjustable sprayer mount mounting the sprayer on the mounting frame for movement relative to the mounting frame, the sprayer mount orienting the sprayer so that the flow path is oriented toward the perimeter surface of the pipeline when the mounting frame is mounted on the pipeline and being configured to selectively move the sprayer relative to the mounting frame to adjust a distance between the spray nozzle and the exterior surface of the pipeline to thereby adjust the width of the flow path at a location where the flow path intersects the exterior surface of the pipeline.

AG. A coating apparatus for coating a perimeter surface of a pipeline, the coating apparatus comprising:
a sprayer configured to deliver a curable liquid along a flow path; and
a mounting frame connected to and supporting the sprayer and configured to be selectively mounted on the pipeline to orient the sprayer so that the flow path intersects the perimeter surface of the pipeline, the mounting frame comprising:
a central bracket having a first end portion, a second end portion, and a width extending between the first and second end portions,
a first end bracket pivotally connected to the first end portion of the central bracket to pivot relative the central bracket around a first pivot axis, and
a second end bracket pivotally connected to the second end portion of the central bracket to pivot relative the central bracket around a second pivot axis spaced apart from the first pivot axis,
the first and second end brackets being selectively pivotable relative the central bracket between a closed position and an open position,
in the closed position, the mounting frame being shaped and arranged for extending circumferentially around at least a portion the pipeline to mount the coating apparatus on the pipeline, and
in the open position, the mounting frame defining an open gap having a width extending along a gap axis that is wider than the pipeline so that the coating apparatus may be removed from the pipeline with the pipeline passing through the gap along a movement axis generally perpendicular to the gap axis without contacting the mounting frame.

AH. A coating apparatus as set forth in claim AG wherein each of the first and second end brackets comprises a first end portion, second end portion, and width extending between the first and second end portions, the first end portion of the first end bracket being pivotally attached to the first end portion of the central bracket and the first end portion of the second end bracket being pivotally attached to the second end portion of the central bracket.

AI. A coating apparatus as set forth in claim AH wherein the second end portions of the first and second end brackets are positioned adjacent one another when the first and second end brackets are positioned in the closed position.

AJ. A coating apparatus as set forth in claim AI further comprising a retaining member fixed to the first end bracket and a locking member movably attached to the second end bracket configured to selectively move relative the second end bracket to engage the retaining member and thereby lock the mounting frame in the closed position.

AK. A coating apparatus as set forth in claim AG wherein the central bracket and first and second end brackets are shaped and arranged to extend substantially around the entire circumference of the pipeline in the closed position.

AL. A coating apparatus as set forth in claim AG further comprising a drive wheel mounted on the mounting frame for rotation about a drive axis, the mounting bracket being shaped and arranged to automatically position the drive wheel in contact with the pipeline when the mounting frame is mounted on the pipeline in the closed position.

AM. A coating apparatus for coating a perimeter surface of a pipeline, the coating apparatus comprising:
a sprayer configured to deliver a curable liquid along a flow path;

a mounting frame connected to and supporting the sprayer and configured to be selectively mounted on the pipeline to orient the sprayer so that the flow path intersects the perimeter surface of the pipeline, the mounting frame comprising first and second brackets having interlocking end portions, the first and second brackets being selectively movable relative to one another from an open position in which the interlocking end portions are spaced apart from one another to define an open gap sized and arranged to allow the pipeline to pass through the gap and into the mounting frame, and a closed position in which the interlocking ends are positioned adjacent to one another such that the mounting frame is sized and arranged to extend circumferentially around the pipeline to mount the coating apparatus on the pipeline; and a locking mechanism comprising:

a retaining member at the interlocking end portion of the first bracket; and a locking member pivotally connected to the interlocking end portion of the second bracket sized and arranged for interlocking engagement with the retaining member, the locking member being selectively pivotable around a pivot axis when the first and second brackets are in the closed position from an unlocked position in which the locking member is spaced apart from the retaining member to a locked position in which the locking member interlockingly engages the retaining member to lock the mounting frame in the closed position.

AN. A coating apparatus as set forth in claim AM wherein the locking member comprises at least one hook member comprising a hook end sized and arranged for interlockingly engaging the retaining member in the locked position.

AO. A coating apparatus as set forth in claim AN wherein the retaining member comprises a retaining shaft extending along an axis oriented generally parallel to the pivot axis.

AP. A coating apparatus as set forth in claim AN wherein the locking mechanism further comprises a pivoting shaft pivotally attached to the interlocking end portion of the second bracket, the at least one hook being fixedly mounted on the pivoting shaft for pivoting therewith around the pivot axis.

AQ. A coating apparatus as set forth in claim AN wherein the at least one hook member comprises a free end opposite the hook end and the locking mechanism further comprises a pneumatic cylinder operatively connected the free end of the at least one hook member and the second bracket to pivot the hook member around the pivot axis.

AR. A coating apparatus as set forth in claim AM wherein the first bracket comprises first and second bracket members spaced apart along the pivot axis and the second bracket comprises first and second bracket members spaced apart along the pivot axis, the retaining shaft extending between the first and second bracket members of the first bracket and locking member comprising a pivot shaft extending along the pivot axis between the first and second bracket members of the second bracket and a plurality of hook members connected to the pivot shaft in spaced apart relationship along the pivot axis.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A coating apparatus for coating a perimeter surface of a pipeline, the coating apparatus comprising:

a mounting frame configured to be selectively mounted on the pipeline;

a sprayer mounted on the mounting frame and configured to deliver fluid along a flow path oriented toward the perimeter surface of the pipeline when the mounting frame is mounted on the pipeline, the sprayer being selectively switchable between operational modes including a preparation mode in which the sprayer delivers a fluid along the flow path to prepare the sprayer for spraying and a spraying mode in which the sprayer sprays the curable liquid along the flow path in a spray pattern; and a fluid diverter secured to the mounting frame and selectively movable relative to the sprayer between a fluid diverting position in which the diverter is positioned in the flow path to divert the fluid delivered from the sprayer away from the perimeter surface of the pipeline when the sprayer is operating in the preparation mode and a non-diverting position in which the diverter is not positioned in the flow path to permit free flow of the curable liquid from the sprayer in the spray pattern when the sprayer is operating in the spraying mode.

2. The coating apparatus as set forth in claim 1 wherein the diverter is movable along a diverter movement axis oriented transverse to the flow path.

3. The coating apparatus as set forth in claim 2 further comprising a diverter guide oriented parallel to the diverter movement axis, the diverter being slidably attached to the diverter guide for movement along the diverter movement axis.

4. The coating apparatus as set forth in claim 3 further comprising a pneumatic cylinder operatively connected between the diverter and the guide to drive the diverter to move along the diverter movement axis.

5. The coating apparatus as set forth in claim 1 wherein the diverter comprises a tube comprising inner and outer axial ends.

6. The coating apparatus as set forth in claim 5 wherein the tube is shaped and arranged to receive the diverted fluid when the diverter is in the fluid diverting position.

7. The coating apparatus as set forth in claim 6 wherein the tube comprises an inner axial end wall at the inner axial end of the tube.

8. The coating apparatus as set forth in claim 7 wherein the tube further comprises a side wall and an aperture formed in the side wall adjacent the inner axial end wall.

9. The coating apparatus as set forth in claim 8 wherein, when the diverter is positioned in the fluid diverting position, the aperture is positioned in the flow path opposite the sprayer such that the fluid delivered from the sprayer is delivered through the aperture and into the tube.

10. The coating apparatus as set forth in claim 6 further comprising a vacuum system and wherein the tube is operatively connected to the vacuum system.

11. The coating apparatus as set forth in claim 10 wherein the vacuum system is operative to draw the diverted fluid through the tube when the diverter is in the fluid diverting position and is operative to draw fumes associated with the curable liquid through the tube when the diverter is in the non-diverting position.

12. The coating apparatus as set forth in claim 6 further comprising an overspray shroud having a sprayer opening, the sprayer being oriented relative to the shroud to deliver fluid along the flow path through the sprayer opening.

13. The coating apparatus as set forth in claim 12 wherein the tube comprises an aperture adjacent the inner axial end, the tube extending through the shroud such that the inner axial end and the aperture are received within an interior of the shroud.

14. The coating apparatus as set forth in claim 1 wherein the coating apparatus is configured to move the sprayer around the circumference of the pipe when the sprayer is operating in the spraying mode to coat the perimeter surface with the curable material, the sprayer being fixed in position relative to the mounting frame when the mounting frame is mounted on the pipeline.

15. The coating apparatus as set forth in claim 1 further comprising a controller configured to automatically move the diverter from the fluid diverting position to the non-diverting position when the sprayer switches operational modes from the preparation mode to the spraying mode.

16. A coating apparatus as set forth in claim 1 wherein the fluid diverter is mounted on the mounting frame for movement with respect to the mounting frame between the diverting position and the non-diverting position.

\* \* \* \* \*